United States Patent
Liu et al.

(10) Patent No.: US 10,003,986 B2
(45) Date of Patent: Jun. 19, 2018

(54) DEVICE, NETWORK, AND METHOD FOR COMMUNICATIONS WITH VARIABLE-DURATION REFERENCE SIGNALS

(71) Applicant: Futurewei Technologies, Inc., Plano, TX (US)

(72) Inventors: Jialing Liu, Palatine, IL (US); Qian Cheng, Aurora, IL (US); Weimin Xiao, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days. days.

(21) Appl. No.: 14/863,382

(22) Filed: Sep. 23, 2015

(65) Prior Publication Data

US 2016/0234706 A1    Aug. 11, 2016

Related U.S. Application Data

(60) Provisional application No. 62/056,334, filed on Sep. 26, 2014.

(51) Int. Cl.
*H04W 24/08*    (2009.01)
*H04L 12/24*    (2006.01)
(Continued)

(52) U.S. Cl.
CPC ......... *H04W 24/08* (2013.01); *H04L 27/0006* (2013.01); *H04L 27/2602* (2013.01);
(Continued)

(58) Field of Classification Search
CPC .................... H04W 24/08; H04W 72/0453
See application file for complete search history.

(56) References Cited

U.S. PATENT DOCUMENTS

2002/0187783 A1    12/2002    Sugaya
2007/0086405 A1    4/2007    Wang
(Continued)

FOREIGN PATENT DOCUMENTS

CN    1287417 A    3/2001
CN    1391362 A    1/2003
(Continued)

OTHER PUBLICATIONS

"Wireless LAN Medium Access Control (MAC) and Physical Layer (PHY) Specifications," IEEE Standard for Information Technology Telecommunications and Information Exchange Between Systems, Local and Metropolitan Area Networks, Specific Requirements, IEEE Std 802.11-2007 (Revision of IEEE Std 802.11-1999), 2007, 1232 pages.
(Continued)

*Primary Examiner* — Feben M Haile
(74) *Attorney, Agent, or Firm* — Slater Matsil, LLP

(57) ABSTRACT

A device, network, and method for providing a variable-duration reference signal. In an embodiment, a method for wireless communications includes determining, by a first device, a starting timing and an ending timing of one or more symbols of a first carrier in accordance with a reference timing for transmission and reception, wherein each of the one or more symbols has a fixed duration; determining, by the first device, a signal of variable duration on the first carrier, wherein the starting timing of the signal of variable duration is offset from the starting timing of any of the one or more symbols of the first carrier in accordance with the reference timing; and transmitting, by the first device on the first carrier, the signal of variable duration, at the starting timing of the signal of variable duration.

30 Claims, 23 Drawing Sheets

(51) Int. Cl.
*H04W 72/04* (2009.01)
*H04L 27/26* (2006.01)
*H04L 27/00* (2006.01)
*H04L 5/00* (2006.01)
*H04L 5/14* (2006.01)

(52) U.S. Cl.
CPC ...... *H04L 27/2662* (2013.01); *H04L 41/0803* (2013.01); *H04W 72/0453* (2013.01); *H04L 5/001* (2013.01); *H04L 5/0048* (2013.01); *H04L 5/0053* (2013.01); *H04L 5/1469* (2013.01)

(56) References Cited

U.S. PATENT DOCUMENTS

2009/0092090 A1* 4/2009 Beems Hart .......... H04L 5/0037
                                                         370/329
2015/0341934 A1* 11/2015 Sorrentino .......... H04B 7/2656
                                                         370/329

FOREIGN PATENT DOCUMENTS

| CN | 102520426 A | 6/2012 | | |
|---|---|---|---|---|
| EP | 1067700 A2 | 1/2001 | | |
| WO | 2005062728 A2 | 7/2005 | | |
| WO | 2013112983 A2 | 8/2013 | | |
| WO | WO 2016045620 A1 * | 3/2016 | ......... | H04L 41/0803 |

OTHER PUBLICATIONS

"Broadband Radio Access Networks (BRAN); 5 GHz High Performance RLAN; Harmonized EN Covering the Essential Requirements of Article 3.2 of the R&TTE Directive," ETSI EN 301 V1.7.1, Jun. 2012, 90 pages.

Nakamura, T., Fujitsu Limited., LTE-Advanced (3GPP Release 10 and beyond)—RF aspects-, Dec. 17-18, 2009, Bejing, China, 3GPP TSG-RAN-WG4 Chairman, 22 pages.

3GPP TR 36.872 V12.1.0 (2013-12); 3rd Generation Partnership Project; Technical Specification Group Radio Access Network; Small cell enhancements for E-UTRA and E-UTRAN—Physical layer aspects (Release 12); 100 pages.

3GPP TS 36 211 V12.6.0 (Jun. 2015); 3rd Generation Partnership Project; Technical Specification Group Radio Access Network; Evolved Universal Terrestrial Radio Access (E-UTRA); Physical channels and modulation (Release 12); 136 pages.

3GPP TS 36.133 V10.15.0 (2014-07); 3rd Generation Partnership Project; Technical Specification Group Radio Access Network; Evolved Universal Terrestrial Radio Access (E-UTRA); Requirements for support of radio resource management (Release 10); 725 pages.

3GPP TS 36.211 V11.0.0 (2012-09); 3rd Generation Partnership Project; Technical Specification Group Radio Access Network; Evolved Universal Terrestrial Radio Access (E-UTRA); Physical Channels and Modulation (Release 11); 106 pages.

ETSI TS 136 133 V12.5.0 (2014-11); LTE; Evolved Universal Terrestrial Radio Access (E-UTRA); Requirements for support of radio resource management (3GPP TS 36.133 version 12.5.0 Release 12); 879 pages.

Wegmann, B., et al., "Inter-RAT MRO in 3GPP Rel. 11: What works, and what does not", Vehicular Technology Conference (VTC Spring), 2013 IEEE 77th, Jun. 2-5, 2013, 5 pages.

Roessler, A. et al., LTE-Advanced (3GPP Rel. 11) Technology Introduction, White Paper, Rohde & Schwarz LTE-Advanced (3GPP Rel.11) Technology Introduction, 7.2013, 39 pages.

Sankaran, C.B., Motorola Mobility India, LTE-Advanced and 4G Wireless Communcations: Part 2, "Data Offloading Techniques in 3GPP Rel-10 Networks: A Tutorial", IEEE Communication Magazine, Jun. 2012, 8 pages.

3GPP, Overview of 3GPP Release 10 V0.2.1 (Jun. 2014); 144 pages.
3GPP, Overview of 3GPP Release 11 V0.2.0 (Sep. 2014); 179 pages.

* cited by examiner

US 10,003,986 B2

DEVICE, NETWORK, AND METHOD FOR COMMUNICATIONS WITH VARIABLE-DURATION REFERENCE SIGNALS

This application claims the benefit of U.S. Provisional Application No. 62/056,334, filed on Sep. 26, 2014 which application is hereby incorporated herein by reference

TECHNICAL FIELD

The present disclosure relates to wireless communications, and, in particular embodiments, to a device, network, and method for communications with variable-duration reference signals (RS).

BACKGROUND

The amount of wireless data being transferred is expected to exceed that of wired data, pushing the limits of macro cellular deployment. Small cell deployment with higher density and/or with diversified spectrum resources may be used to help handle this increase in data capacity, while meeting customer quality of service expectations and operators' requirements for cost-effective service delivery.

Small cells generally are low-power wireless access points that operate in a licensed spectrum. Small cells provide improved cellular coverage, capacity and applications for homes and businesses, as well as metropolitan and rural public spaces. Different types of small cells include, generally from smallest size to largest size, femtocells, picocells, and microcells. Small cells may be densely deployed and may also utilize additional spectrum resources, such as unlicensed spectrum resources, high-frequency spectrum resources, etc.

SUMMARY

An embodiment method for wireless communications includes determining, by a first device, a starting timing and an ending timing of one or more symbols of a first carrier in accordance with a reference timing for transmission and reception, wherein each of the one or more symbols has a fixed duration; determining, by the first device, a signal of variable duration on the first carrier, wherein the starting timing of the signal of variable duration is offset from the starting timing of any of the one or more symbols of the first carrier in accordance with the reference timing; and transmitting, by the first device on the first carrier, the signal of variable duration, at the starting timing of the signal of variable duration.

An embodiment method in a user equipment (UE) for receiving a signal of variable duration from a transmission point in a wireless network includes receiving a configuration of a signal of variable duration for a first carrier from the transmission point (TP), wherein the configuration signaling is received on a second carrier from the TP; receiving a signal to start monitoring the first carrier, wherein the signal is received on the second carrier from the TP; capturing at least a portion of the signal of variable duration in the first carrier from the TP; and determining timing information according to a partial signal of variable duration, the timing information comprising a starting timing and an ending timing of one or more symbols of the first carrier in accordance with a reference timing, wherein the starting timing of the captured portion of the signal of variable duration is offset from the starting timing of any of the one or more symbols.

An embodiment network device for transmitting a signal to a wireless device, includes a processor and a non-transitory computer readable storage medium storing programming for execution by the processor, the programming including instructions to: determine a starting timing and an ending timing of one or more symbols of a first carrier in accordance with a reference timing for transmission and reception, wherein each of the symbols has a fixed duration; determine a signal of variable duration on the first carrier, wherein the starting timing of the signal of variable duration is offset from the starting timing of any of the one or more symbols of the first carrier in accordance with the reference timing; and transmit on the first carrier, the signal of variable duration, at the starting timing of the signal of variable duration.

An embodiment network device for obtaining a reference signal from a transmission point in a wireless network includes a processor and a non-transitory computer readable storage medium storing programming for execution by the processor, the programming including instructions to: receive a configuration of signal of variable duration for a first carrier from a transmission point (TP), wherein the configuration signaling is received on a second carrier from the TP; receive a signal to start monitoring the first carrier, wherein the signal is received on the second carrier from the TP; capture at least a portion of a signal of variable duration in the first carrier from the TP; and determine control information according to a partial signal of variable duration, timing information comprising a starting timing and an ending timing of one or more symbols of the first carrier in accordance with a reference timing, wherein the starting timing of the captured portion of the signal of variable duration is offset from the starting timing of any of the one or more symbols.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

In an embodiment, a method of providing discontinuous measurements and transmission in a network includes transmitting, by a controller device to a user equipment (UE), a reference signal (RS) whose duration may not be known to the UE a priori; receiving, by the UE, the RS; and processing, by the UE, a portion of the RS. In an embodiment, the RS duration is not a multiple of OFDM symbol duration. In an embodiment, the UE acquires timing and frequency synchronization from the portion of the RS.

Typically, in a modern wireless communications system, such as a Third Generation Partnership Project (3GPP) Long Term Evolution (LTE) compliant communications system, a plurality of cells or evolved NodeBs (eNB) (also commonly referred to as NodeBs, base stations (BSs), base terminal stations, communications controllers, network controllers, controllers, access points (APs), and so on) may be arranged into a cluster of cells, with each cell having multiple transmit antennas. Additionally, each cell or eNB may be serving a number of users (also commonly referred to as User Equipment (UEs), wireless devices, mobile stations, users, subscribers, terminals, and so forth) based on a priority metric, such as fairness, proportional fairness, round robin, and the like, over a period of time. It is noted that the terms cell, transmission points (TPs), access points (APs), base stations, controllers, communications controllers, eNBs, and the like and may be used interchangeably throughout this disclosure. Distinction between cells, transmission points, and eNBs, etc. will be made where needed. It is also noted that the term UE is also commonly referred to as a station, a user, a subscriber, a mobile station, a mobile, a terminal, and the like, and may be used interchangeably throughout this disclosure.

Figure 1A:
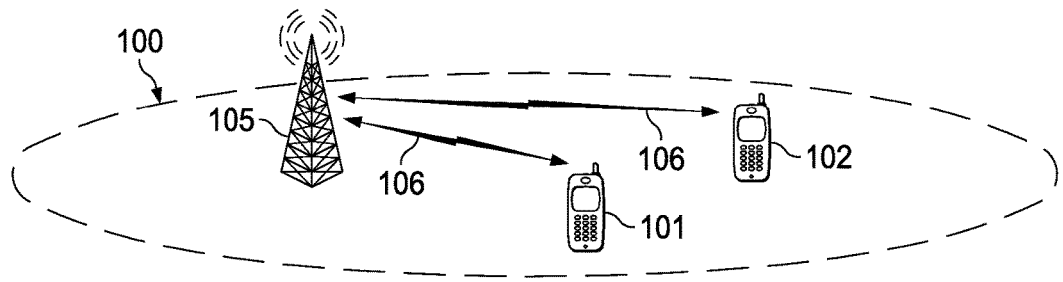
FIG. 1A illustrates cellular communications in a macro cell.

As shown in FIG. 1A, system 100 is a typical wireless network with a communications controller 105 communicating using a wireless link 106 to a first wireless device 101 and a second wireless device 102. The wireless link 106 can include a single carrier frequency such as used typically for a time division duplex (TDD) configuration or a pair of carrier frequencies as used in a frequency division duplex (FDD) configuration. Not shown in system 100 are some of the network elements used to support the communications controller 105 such as a backhaul, management entities, etc. The transmission/reception from controller to a UE is called downlink (DL) transmission/reception, and the transmission/reception from a UE to a controller is called uplink (UL) transmission/reception. The communication controller 105 may include an antenna, a transmitter, a receiver, a processor, and non-transitory computer readable storage and/or memory. The communication controller 105 may be implemented as or referred to as a transmission point (TP), BS, a base transceiver station (BTS), an AP, an eNB, a network controller, a controller, a base terminal station, and so on. These terms may be used interchangeably throughout this disclosure.

Figure 1B:
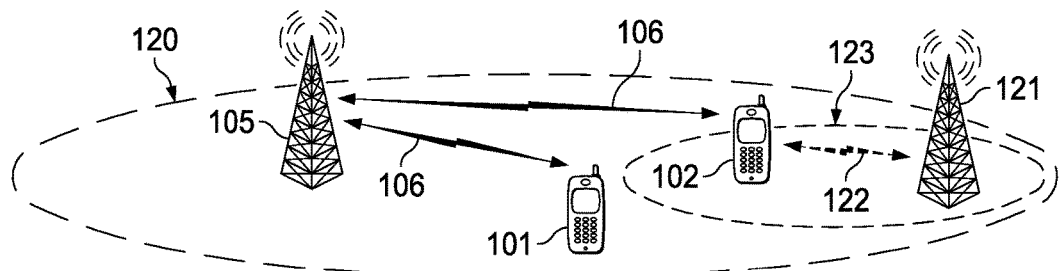
FIG. 1B illustrates cellular communications in a heterogeneous network with a macro cell and a pico cell.

As shown in FIG. 1B, system 120 is an example wireless heterogeneous network (HetNet) with communications controller 105 communicating to wireless device 101 using wireless link 106 (solid line) and to wireless device 102 using wireless link 106. A second communications controller 121, such as a pico cell, has a coverage area 123 and is capable of communicating to wireless device 102 using wireless link 122. Typically, wireless link 122 and wireless link 106 use the same carrier frequency, but wireless link 122 and wireless link 106 can use different frequencies. There may be a backhaul (not shown) connecting communications controller 105 and communications controller 121. A HetNet may include a macro cell and a pico cell, or generally a higher power node/antenna with a larger coverage and lower power node/antennas with a smaller coverage. Lower power nodes (or lower power points, picos, femtos, micros, relay nodes, remote radio heads (RRHs), remote radio units, distributed antennas, etc.) generally are low-power wireless access points that operate in a licensed spectrum. Small cells may use lower power nodes. Lower power nodes provide improved cellular coverage, capacity and applications for homes and businesses, as well as metropolitan and rural public spaces. In an embodiment, a licensed band means that an individual entity pays a licensing fee for the exclusive right to transmit on assigned channels within that band in a given geographic area.

In a network such as system 120 in FIG. 1B, there may be multiple macro points 105 and multiple pico points 121 operating with multiple component carriers, and the backhaul between any two points can be fast backhaul or slow backhaul depending on the deployment. When two points have fast backhaul, the fast backhaul may be fully utilized, e.g., to simplify the communication method and system or to improve coordination. In a network, the points configured for a UE for transmission or reception may include multiple points, some pairs of points may have fast backhaul, but some other pairs of points may have slow backhaul or any backhaul.

In a deployment, an eNodeB may control one or more cells. Multiple remote radio units may be connected to the same base band unit of the eNodeB by fiber cable, and the latency between base band unit and remote radio unit is quite small. Therefore the same base band unit can process the coordinated transmission/reception of multiple cells. For example, the eNodeB may coordinate the transmissions of multiple cells to a UE, which is called coordinated multiple point (CoMP) transmission. The eNodeB may also coordinate the reception of multiple cells from a UE, which is called CoMP reception. In this case, the backhaul link between these cells with the same eNodeB is fast backhaul and the scheduling of data transmitted in different cells for the UE can be easily coordinated in the same eNodeB.

As an extension of the HetNet deployment, possibly densely deployed small cells using low power nodes are considered promising to cope with mobile traffic explosion, especially for hotspot deployments in indoor and outdoor scenarios. A low-power node generally means a node whose transmission power is lower than macro node and BS classes, for example Pico and Femto eNB are both applicable. Small cell enhancements for E-UTRA and E-UTRAN, which is an ongoing study in 3GPP, will focus on additional functionalities for enhanced performance in hotspot areas for indoor and outdoor using possibly densely deployed low power nodes.

Figure 1C:
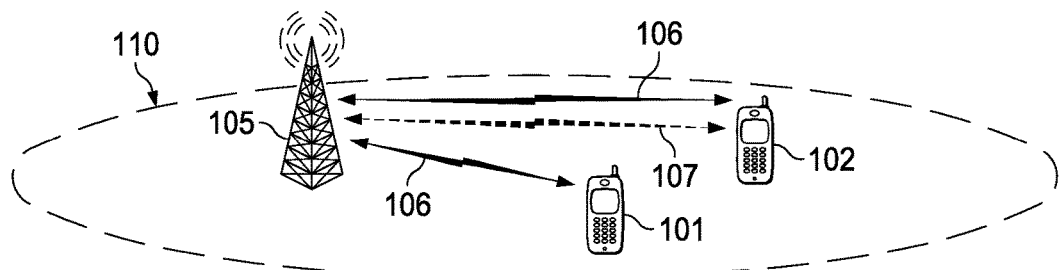
FIG. 1C illustrates cellular communications in a macro cell with carrier aggregation.

As shown in FIG. 1C, system 110 is a typical wireless network configured with carrier aggregation (CA) where communications controller 105 communicates to wireless device 101 using wireless link 106 (solid line) and to wireless device 102 using wireless link 107 (dashed line) and wireless link 106. In some embodiment deployments, for wireless device 102, wireless link 106 can be called a primary component carrier (PCC) while wireless link 107 can be called a secondary component carrier (SCC). In some carrier aggregation deployments, the PCC can be provided feedback from a wireless device to a communications controller while the SCC can carry data traffic. In the 3GPP Rel-10 specification, a component carrier is called a cell. When multiple cells are controlled by a same eNodeB, cross scheduling of multiple cells is possible to be implemented because there may be a single scheduler in the same eNodeB to schedule the multiple cells. With CA, one eNB may operate and control several component carriers forming primary cell (Pcell) and secondary cell (Scell). In Rel-11 design, an eNodeB may control both a Macro cell and a Pico cell. In this case, the backhaul between the Macro cell and the Pico cell is fast backhaul. The eNodeB can control the transmission/reception of both macro cell and Pico cell dynamically.

Figure 1D:
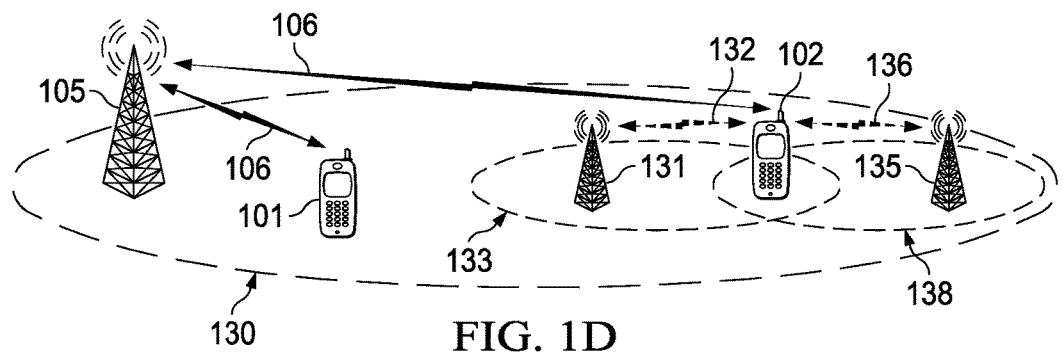
FIG. 1D illustrates cellular communications in a heterogeneous network with a macro cell and several small cells.

As shown in FIG. 1D, system 130 is an embodiment wireless heterogeneous network with communications controller 105 communicating to wireless device 101 using wireless link 106 (solid line) and to wireless device 102 using wireless link 106. A second communications controller 131, such as a small cell, has a coverage area 133 and is capable of communicating to wireless device 102 using wireless link 132. A communications controller for another small cell 135 has coverage area 138 and uses wireless link 136. Communications controller 135 is capable of communicating to wireless device 102 using wireless link 136. Coverage areas 133 and 138 may overlap. The carrier frequencies for wireless links 106, 132, and 136 may be the same or may be different.

Figure 1E:
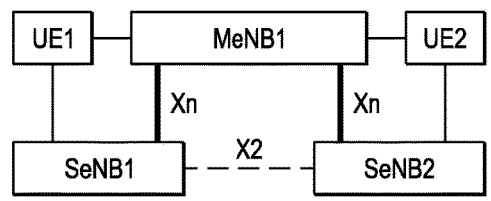
FIG. 1E illustrates an embodiment dual connectivity scenario.

FIG. 1E shows an embodiment system configured for dual connectivity. A master eNB (MeNB) is connected to one or more secondary eNBs (SeNBs) using an interface such as the Xn interface (Xn can be X2 in some specific cases). The backhaul can support this interface. Between the SeNBs, there may be an X2 interface. A UE, such as UE1, is connected wirelessly to MeNB1 and SeNB1. A second UE, UE2, can connect wirelessly to MeNB1 and SeNB2.

In orthogonal frequency-division multiplexing (OFDM) systems, the frequency bandwidth is divided into multiple subcarriers in frequency domain. In the time domain, one subframe is divided into multiple OFDM symbols. Each OFDM symbol may have a cyclic prefix to avoid the inter-symbol interference due to multiple path delays. One resource element (RE) is defined by the time-frequency resource within one subcarrier and one OFDM symbol. A reference signal and other signals, such as a data channel, e.g. physical downlink shared channel (PDSCH), and a control channel, e.g. physical downlink control channel (PDCCH), are orthogonal and multiplexed in different resource elements in time-frequency domain. Further, the signals are modulated and mapped into resource elements. For each OFDM symbol, the signals in the frequency domain are transformed into the signals in time domain using, e.g., Fourier transforms, and are transmitted with added cyclic prefix to avoid the inter-symbol interference.

Each resource block (RB) contains a number of REs. FIG. 2A illustrates embodiment OFDM symbols with normal cyclic prefix (CP). There are 14 OFDM symbols labeled from 0 to 13 in each subframe. The symbols 0 to 6 in each subframe correspond to even numbered slots, and the symbols 7 to 13 in each subframe correspond to odd numbered slots. In the figure, only one slot of a subframe is shown. There are 12 subcarriers labeled from 0 to 11 in each RB, and hence in this example, there are 12×14=168 REs in a RB pair (an RB is 12 subcarriers by the number of symbols in a slot). In each subframe, there are a number of RBs, and the number may depend on the bandwidth (BW).

Figure 2B:
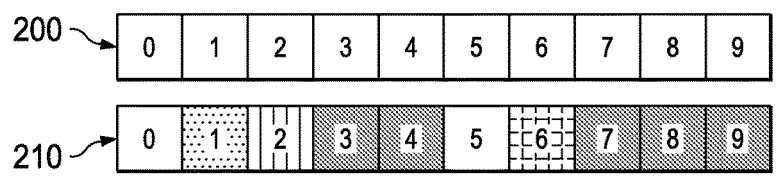
FIG. 2B illustrates an embodiment frame structure for a frequency division duplexing (FDD) configuration and a time division duplexing (TDD) configuration.

FIG. 2B shows two frame configurations used in LTE. Frame 200 is typically used for a FDD configuration, where all 10 subframes, labeled 0 through 9, communicate in the same direction (downlink in this example). Each subframe is 1 millisecond in duration and each frame is 10 milliseconds in duration. Frame 210 shows a TDD configuration where certain subframes are allocated for downlink transmissions (such as unshaded boxes (subframes 0 and 5), for uplink transmissions (vertical lines (subframe 2)), and special (dotted box (subframe 1)) which contain both uplink and downlink transmissions. An entire subframe dedicated for downlink (uplink) transmission can be called a downlink (uplink) subframe. Subframe 6 can be either a downlink or a special subframe depending on TDD configuration. Each of the solid shaded boxes (subframes 3, 4, 7, 8, and 9) can be either a downlink subframe or an uplink subframe depending on TDD configuration. The coloring used in frame 210 is exemplary but is based on the standards TSG 36.211 Rel. 11, which is hereby incorporated herein by reference.

Figure 2C:
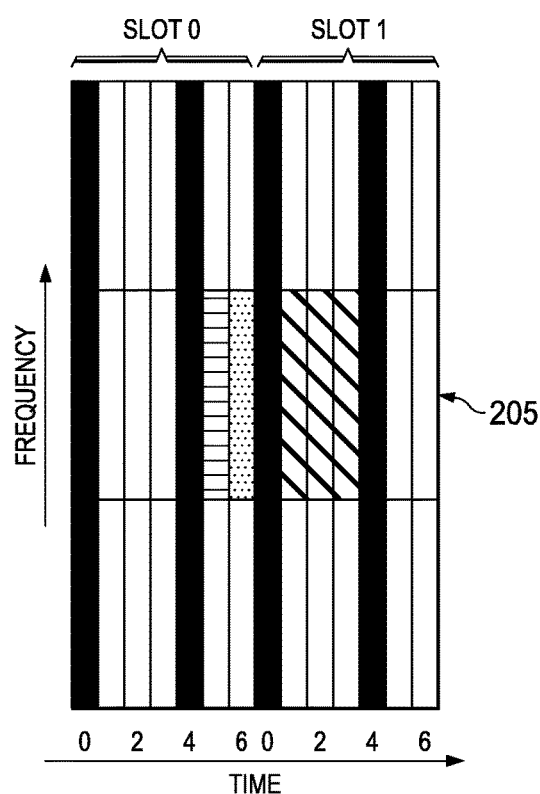
FIG. 2C illustrates an embodiment OFDM subframe for FDD configuration.
Figure 2A:
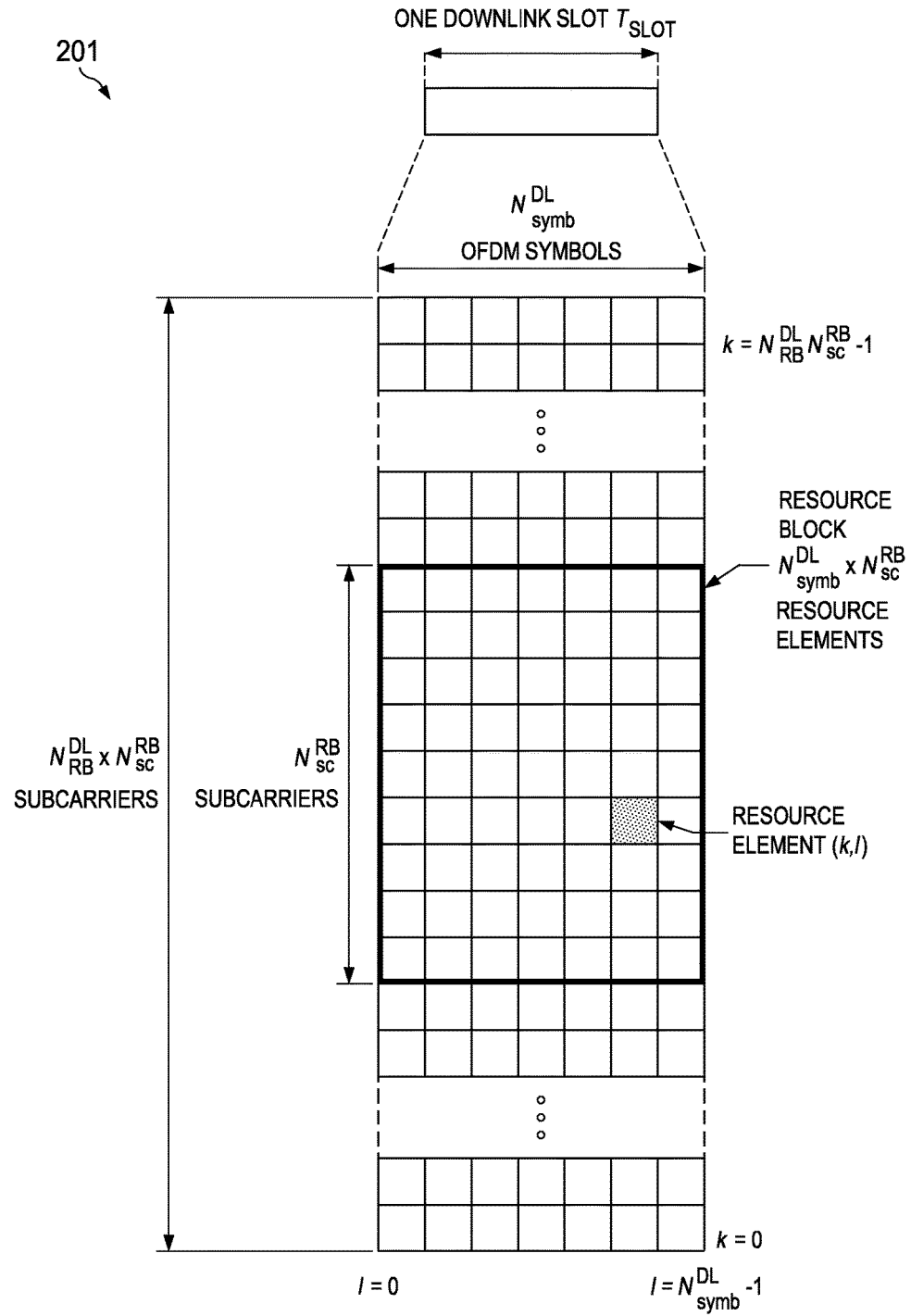
FIG. 2A illustrates embodiment orthogonal frequency division multiplexing (OFDM) symbols with normal cyclic prefix (CP)
Figure 2D:
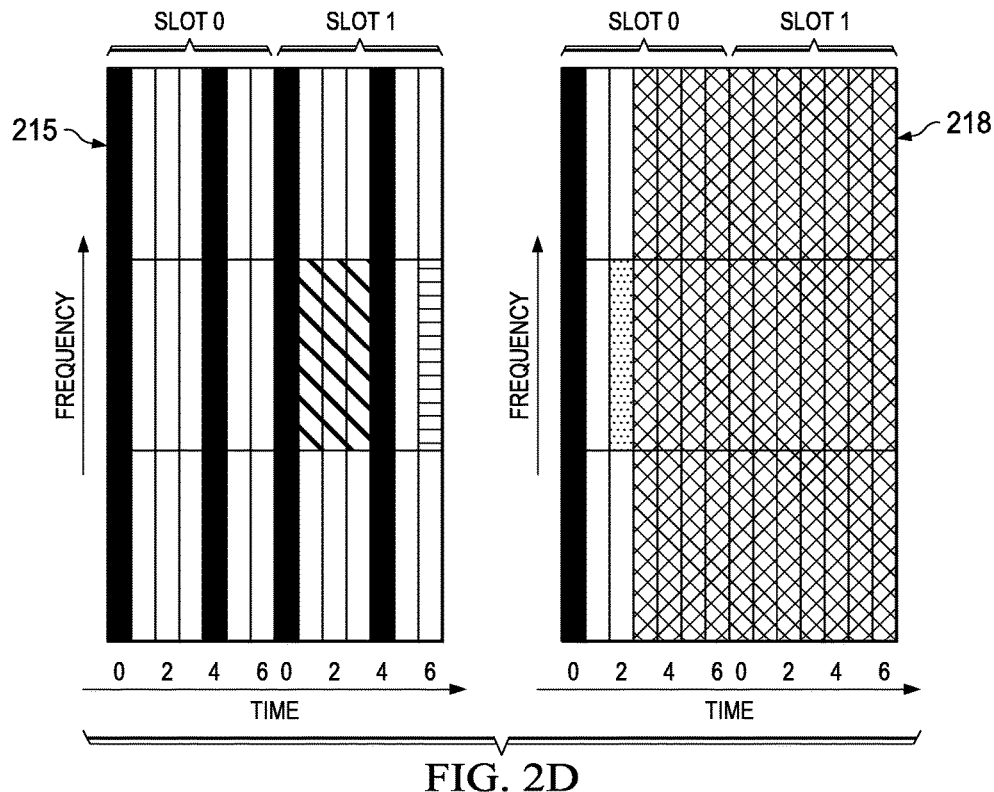
FIG. 2D illustrates an embodiment OFDM subframe for TDD configuration.

FIG. 2C and FIG. 2D show embodiments of downlink subframes that are partitioned in terms of symbols and frequency. A subframe, such as subframe 205, is divided into 3 sections in the frequency domain (assuming the number of RBs is greater than 6). An analogous diagram can be shown for a 6 RBs downlink bandwidth (e.g., bandwidth of the downlink carrier).

In FIG. 2C, subframe 205 shows an embodiment of the symbol allocation for an FDD configuration for subframes 0 and 5. The solid shading shows the symbols that have the common reference signal (CRS). The example assumes either CRS is transmitted on antenna port 0 or on antenna ports 0 and 1. The horizontal shading shows the location of the secondary synchronization signal (SSS). The dotted shading shows the location of the primary synchronization signal (PSS). Both the PSS and SSS occupy the center six resource blocks of the downlink carrier. The diagonal lines in symbols 0, 1, 2, 3, of slot 1 represent the location where the physical broadcast channel (PBCH) occupies for subframe 0. The PBCH is not transmitted in subframe 5 in Rel. 11 of the standards. Note, the PSS, SSS, and CRS can be viewed as overhead.

In FIG. 2D, subframe 215 shows an embodiment of the symbol allocation for subframes 0 and 5 of TDD subframe 210 in FIG. 2B. Likewise, subframe 218 shows an embodiment of the symbol allocation for subframes 1 and 6 of TDD subframe 210. In both subframe 215 and subframe 218, the solid shading shows the symbols having the CRS. The example also assumes either CRS is transmitted on antenna port 0 or on antenna ports 0 and 1. The horizontal shading in subframe 215 shows the location of the SSS. The dotted shading in subframe 218 shows the location of the PSS. Both the PSS and SSS occupy the center six RBs of the downlink carrier. The cross shading in subframe 218 indicates that the remaining symbols of the subframe are either downlink (if subframe 6 is a downlink subframe) or a combination of downlink symbols, guard time, and uplink symbols if the subframe is a special subframe. Similar to FIG. 2C, the diagonal lines in symbols 0, 1, 2, 3, of slot 1 represent the location where the PBCH occupies for subframe 0. The PBCH is not transmitted in subframe 5 in Rel. 11 of the standards. Note, the PSS, SSS, and CRS can be viewed as overhead. The information contents of the PBCH (i.e., master information block) can change every 40 ms.

Figure 2E:
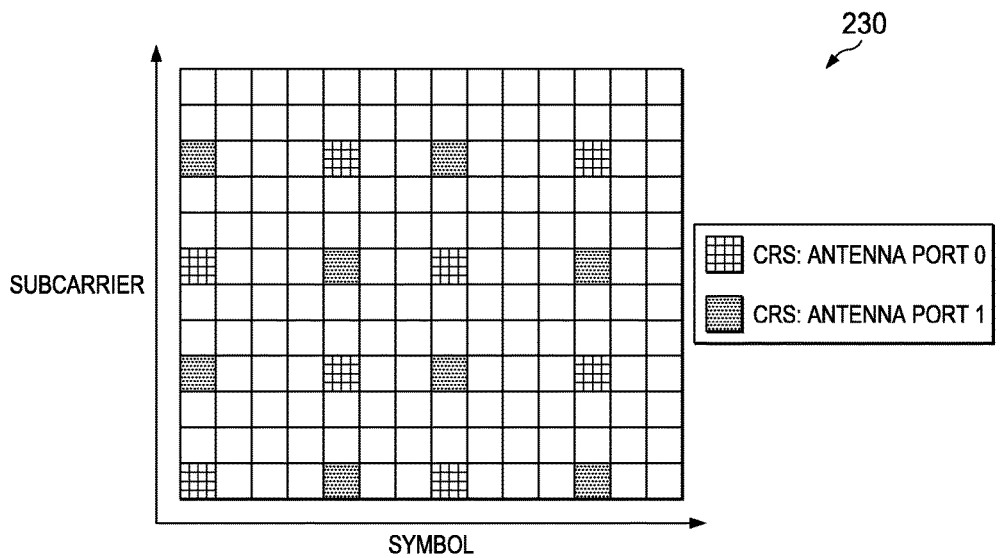
FIG. 2E illustrates an embodiment common reference signal (CRS)

In downlink transmission of LTE-A system, there is reference signal for UE to perform channel estimation for demodulation of PDCCH and other common channels as well as for measurement and some feedbacks, which is CRS inherited from the Rel-8/9 specification of E-UTRA, as shown in diagram 230 in FIG. 2E. Dedicated/de-modulation reference signal (DMRS) can be transmitted together with the PDSCH channel in Rel-10 of E-UTRA. DMRS is used for channel estimation during PDSCH demodulation. DMRS can also be transmitted together with the enhanced PDCCH (EPDCCH) for the channel estimation of EPDCCH by the UE. The notation (E)PDCCH indicates EPDCCH and/or PDCCH.

Figure 2F:
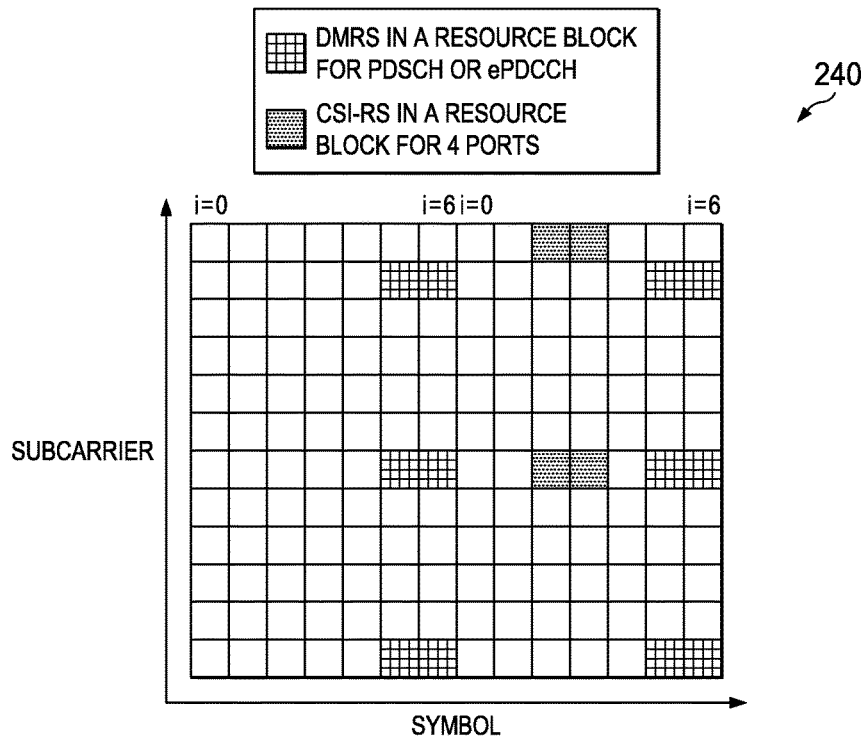
FIG. 2F illustrates an embodiment channel status indicator reference signal (CSI-RS) and dedicated/de-modulation reference signal (DMRS)

In Rel-10, channel status indicator reference signal (CSI-RS) is introduced in addition to CRS and DMRS, as shown in diagram 240 in FIG. 2F. CSI-RS is used for Rel-10 UEs to measure the channel status, especially for multiple antennas cases. PMI/CQI/RI and other feedback may be based on the measurement of CSI-RS for Rel-10 and beyond UE. PMI is the precoding matrix indicator, CQI is the channel quality indicator, and RI is the rank indicator of the precoding matrix. There may be multiple CSI-RS resources configured for a UE. There is specific time-frequency resource and scrambling code assigned by the eNB for each CSI-RS resource.

Figure 2G:
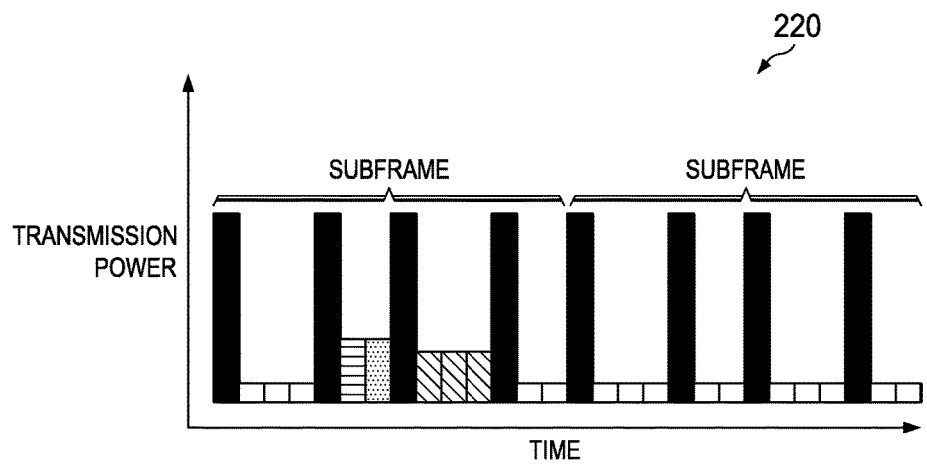
FIG. 2G illustrates an embodiment of transmission power.

FIG. 2G shows an exemplary plot 220 of the transmission power from a communications controller, such as 105 in FIG. 1A, for a FDD configuration for subframes 0 and 1. Plot 220 shows the communication controller still transmits signals such as the CRS (solid shading), the SSS (horizontal shading), the PSS (dotted shading), and the PBCH (diagonal shading) even if there is no other data to transmit on the downlink. The transmission of these signals can increase the interference observed in a system such as in FIG. 1B even when communications controller 121 is not serving a UE such as wireless device 102. This interference can reduce the system capacity.

However, eliminating these signals entirely can impair system operation. For example, a wireless device relies on these signals to synchronize (both time and frequency) and then make measurements.

Figure 2H:
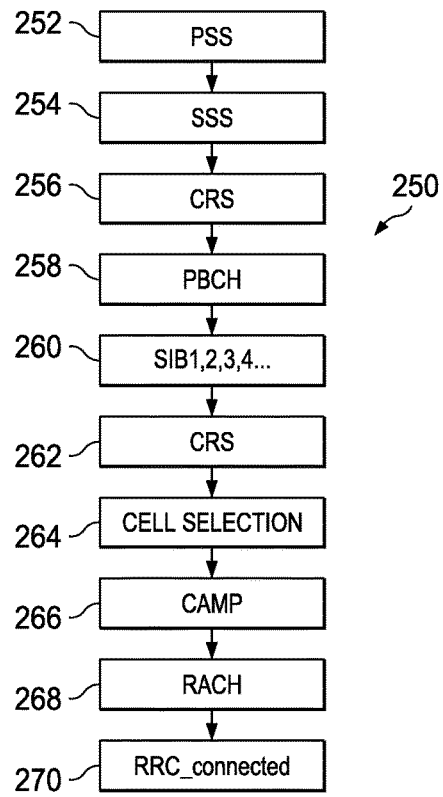
FIG. 2H illustrates an embodiment of a wireless device performing synchronization and measurement using reference signals.

FIG. 2H is a flowchart illustrating an embodiment of a wireless device using the CRS, the SSS, and the PSS signals is presented in the flowchart 250 in FIG. 2H. The wireless device first detects the transmitted PSS in step 252. The wireless device can then detect the SSS in step 254. Having both the PSS and SSS provides the wireless device information such as: 1) frame configuration (FDD or TDD); 2) cyclic prefix used for certain downlink subframes; 3) the cell id; and 4) the location of subframe 0. In addition, the wireless device can perform coarse frequency and timing synchronization using the PSS and SSS.

Since the wireless device knows the cell id, cyclic prefix, and location of subframe 0, the wireless device can make measurements on the CRS in subframes 0 and 5 as shown in step 256. Example measurements are the reference signal received power (RSRP), the received signal strength indicator (RSSI), and the reference signal received quality (RSRQ). The CRS can be used to improve frequency and timing synchronization. If the measurements indicate that the communications controller is satisfactory (in terms of received signal quality), the wireless device may choose to process the PBCH to determine other information such as the number of antenna ports over which the CRS is transmitted, the frame numbering (e.g., 0 to 1023), and the downlink bandwidth (bandwidth of the downlink carrier) as shown in step 258.

The remaining steps in FIG. 2H show how the UE can become assigned to an eNB. In step 260, the UE listens to system information broadcast (SIB) messages, such as SIB1, SIB2, etc. To listen to SIB messages, the UE typically receives the PDCCH to process the downlink control information (DCI) to obtain the modulation, coding, etc. information for the PDSCH carrying the SIB message. In step 262, the UE may process more CRS for measurement purposes. In step 264, the UE may compare cells in one or more carriers and select a suitable one. In step 266, the UE may decide to camp on this carrier. In step 268, the UE may begin the random access procedure by transmitting the random access channel (RACH) on the uplink in order to enter the RRC_CONNECTED state in step 270. There may be a message exchange in step 270 between the UE and eNB. UEs have two states: RRC_CONNECTED and RRC_IDLE; the term "connected" can represent RRC_CONNECTED while "idle" can represent "RRC_IDLE. After the UE enters the RRC_CONNECTED, the UE sends a RRCConnectionSetupComplete message to the eNB.

One concept to reduce the interference from eNBs without any UEs attached (assigned, camped) is to turn those eNBs off. When UEs arrive, the eNBs would then turn on. Likewise, when there is no more traffic, the eNBs could then turn off. However, there are many modifications to the standards in order to support the on-off mechanism (on/off adaptation) such as the UE identifying the quality of an eNB based on the persistent transmission of signals such as the PSS, SSS, and CRS; when those signals are absent, how the UE can measure the quality. Other questions regarding small cell on/off adaptation, or more generally, network adaptation, include: (1) Coverage issue: ensuring cellular coverage despite of small cell on/off; (2) Idle UE issue: can small cell operating on/off support UEs in the idle state, what needs to be done to support idle UEs, in the connected state can the UE/eNB exchange data; (3) Legacy UE support (how to support UEs that do not have this feature); (4) How may fast on/off adaptation be supported? More specifically, how may fast on/off adaptation be supported, given procedures/ mechanisms (in Rel-11/12 or even beyond) such as small cell discovery and measurement enhancements; dual connectivity or more broadly, multi-stream aggregation (MSA); CoMP and enhanced CoMP (eCoMP) (including CoMP Scenario 4 (a network with low power RRHs within the macrocell coverage where the transmission/reception points created by the RRHs have the same cell IDs as the macro cell), coordination over non-ideal backhaul); massive carrier aggregation, etc.

A small cell operating on/off adaptation or power adaptation frequently (e.g., in time scale shorter than hours) may not be suitable to support idle UEs because rapid adaptation can cause idle UE to enter cell reselection frequently and consume power. Similarly, they may not be suitable for coverage support that a macro cell can provide. Such a small cell may be mainly used to support active UEs' high traffic demand in addition to the basic functionalities provided by the coverage layer. The cells on the coverage layer may not perform on/off adaptation (at least they may not do so frequently). Idle UEs may be connected to coverage layer cells only. A consequence of this is that small cells do not have to be standalone cells at least from the perspective of legacy UEs. In certain isolated local areas, however, there may exist some scenarios where coverage is not a concern and high capacity is desirable; in such cases standalone small cells operating on/off may be deployed.

Therefore, typical deployment scenarios include a coverage layer whose cells do not perform network adaptation (or at least not too frequently or significantly), and a capacity layer whose cells (mainly small cells) may perform network adaptation. Coverage/mobility and idle UE support are mainly provided by the coverage layer. Typically UEs connect to cells in the coverage layer first, and then connect to small cells in the capacity layer when needed. The small cells may be co-channel or non-co-channel with those in the coverage layer. One embodiment deployment is shown in FIG. 1B.

As one efficient way to deploy and operate the small cells, a virtual cell configuration (e.g., CoMP Scenario 4) is adopted, and the small cells are configured and turned on opportunistically for UEs with high traffic demand. Thus, in such a network, coverage and idle UE support are ensured and not affected by small cell adaptation.

The mechanism of dynamic on/off of a small cell is seen as more beneficial when further evolution of the small cell networks is envisioned. Specifically, to handle the ever increasing needs in data capacity, while meeting customer quality of service expectations and operators' requirements for cost-effective service delivery, the densification of a small cell network is proposed. Roughly speaking, doubling the density of the small cell network can yield doubling of the capacity of the network. However, densification leads to higher interference, especially the interference caused by common channels (e.g. CRS) which are persistently transmitted. Turning off the small cell opportunistically can significantly help reduce interference and improve efficiency of the dense network.

In parallel with increasing the network resources by densifying the network, another way to increase the network resources is to utilize more and more usable spectrum resources, which include not only the licensed spectrum resources of the same type as the macro, but also the licensed spectrum resources of different type as the macro (e.g., the macro is a FDD cell but a small cell may use both FDD and TDD carriers), as well as unlicensed spectrum resources and shared spectrums, and even high-frequency spectrum at millimeter wavelength (mmWave, mm wave, or mm-wave, mmW, etc.) range. The unlicensed spectrums can be used by generally any user, subject to regulation requirements. Traditionally the unlicensed spectrums are not used by cellular networks as it is generally difficult to ensure quality of service (QoS) requirements. Operating on the unlicensed spectrums mainly include wireless local area networks (WLAN), e.g. the Wi-Fi networks. Due to the fact that the licensed spectrum is generally scarce and expensive, utilizing the unlicensed spectrum by the cellular operator may be considered. Note that on high-frequency bands and unlicensed/shared-licensed bands, typically TDD is used and hence the channel reciprocity can be exploited for the communications.

On unlicensed spectrum, generally there is no pre-coordination among multiple nodes operating on the same frequency resources. Thus, a contention-based protocol (CBP) may be used. According to Section 90.7 of Part 90 (paragraph 58) of the United States Federal Communication Commission (FCC), CBP is defined as:

CBP—"A protocol that allows multiple users to share the same spectrum by defining the events that must occur when two or more transmitters attempt to simultaneously access the same channel and establishing rules by which a transmitter provides reasonable opportunities for other transmitters to operate. Such a protocol may consist of procedures for initiating new transmissions, procedures for determining the state of the channel (available or unavailable), and procedures for managing retransmissions in the event of a busy channel." Note that the state of a channel being busy may also be called as channel unavailable, channel not clear, channel being occupied, etc., and the state of a channel being idle may also be called as channel available, channel clear, channel not occupied, etc.

One of the most used CBP is the "listen before talk" (LBT) operating procedure in IEEE 802.11 or WiFi (which can be found in, e.g., "Wireless LAN medium access control (MAC) and physical layer (PHY) specifications," IEEE Std 802.11-2007 (Revision of IEEE Std 802.11-1999)). It is also known as the carrier sense multiple access with collision avoidance (CSMA/CA) protocol. Carrier sensing is performed before any transmission attempt, and the transmission is performed only if the carrier is sensed to be idle, otherwise a random back-off time for the next sensing is applied. The sensing is generally done through a clear channel assessment (CCA) procedure to determine if the in-channel power is below a given threshold. In ETSI EN 301 893 V1.7.1, Clause 4.9.2, it describes 2 types of Adaptive equipment: Frame Based Equipment and Load Based Equipment.

Figure 3A:
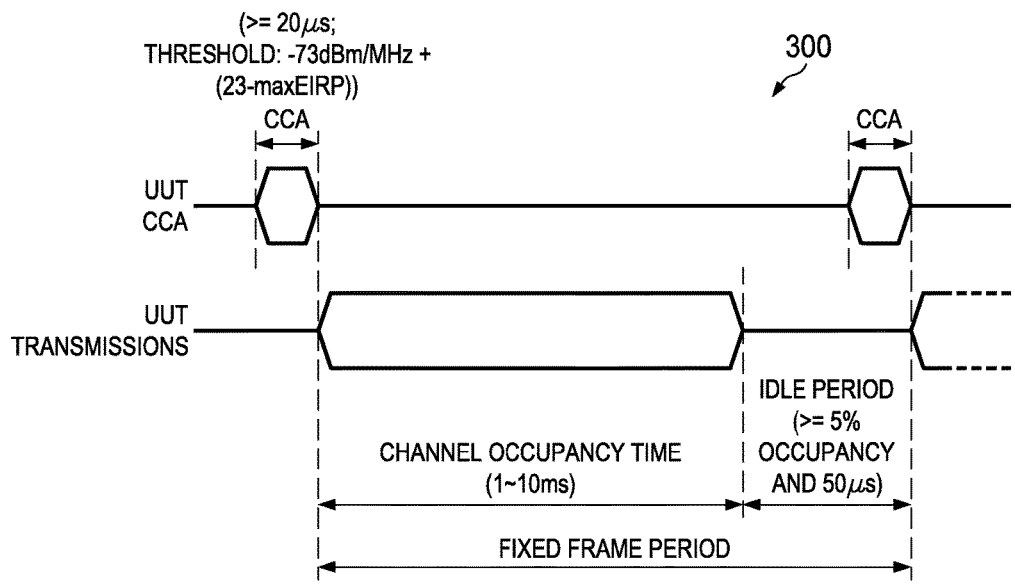
FIG. 3A illustrates an embodiment of frame based equipment operations in unlicensed band.
Figure 3B:
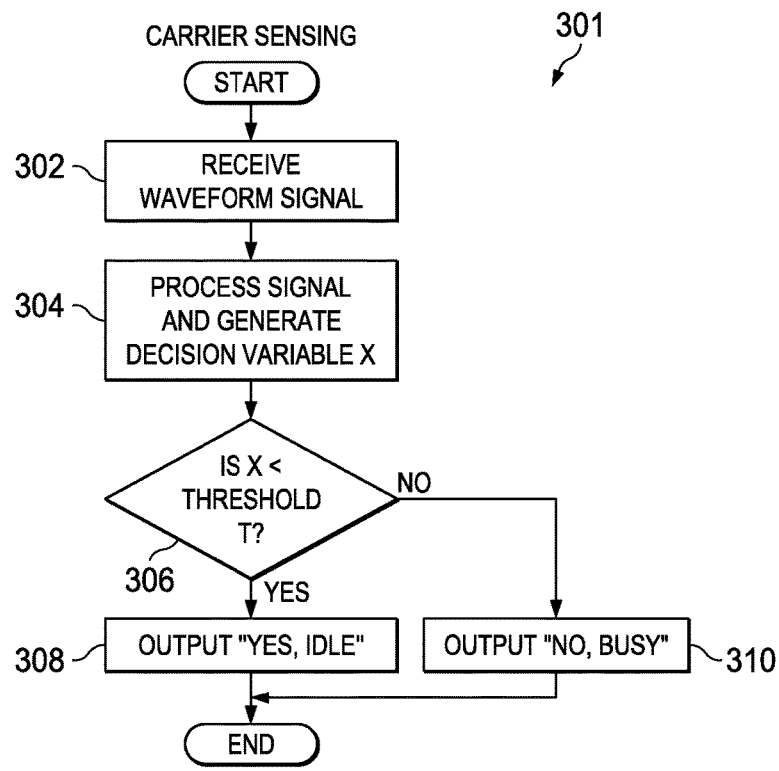
FIG. 3B illustrates an embodiment of carrier sensing in unlicensed band.

An embodiment of timing 300 for Frame Base Equipment is illustrated in FIG. 3A. An example of the flow chart for an embodiment method 301 for carrier sensing is illustrated in FIG. 3B. A flow chart of an embodiment method 320 for a general listen-before-talk mechanism is illustrated in FIG. 3C.

Referring now to FIG. 3B, the method 301 begins at step 302 where the communication controller receives a waveform signal from a UE. At step 304, the communication controller processes the signal and generates a decision variable, X. The signal processing here, in general done in the digital domain which is normally performed in baseband, may include sampling, A/D conversion, receiver's digital combining with precoding weighting, etc. The decision variable, X, is used to determine whether the channel is idle or busy. At step 306, the communication controller determines whether the decision variable is less than a threshold, T. The threshold may be a standardized value, or derived from a standard or some regulation, which may be device type specific, spatial specific, etc. The threshold may also be allowed to change within a specified range according to the traffic loads, interference conditions, etc. If, at step 306, the communication controller determines that the value of the decision variable, X, is less than the threshold, T, the method 301 proceeds to step 308 where the communication controller determines that the carrier channel is idle, after which, the method 301 ends. If, at step 306, the communication controller determines that the value of the decision variable, X, is not less than the threshold, T, then the method 300 proceeds to step 310 where the communication controller determines that the carrier channel is busy, after which, the method 301 ends.

Figure 3C:
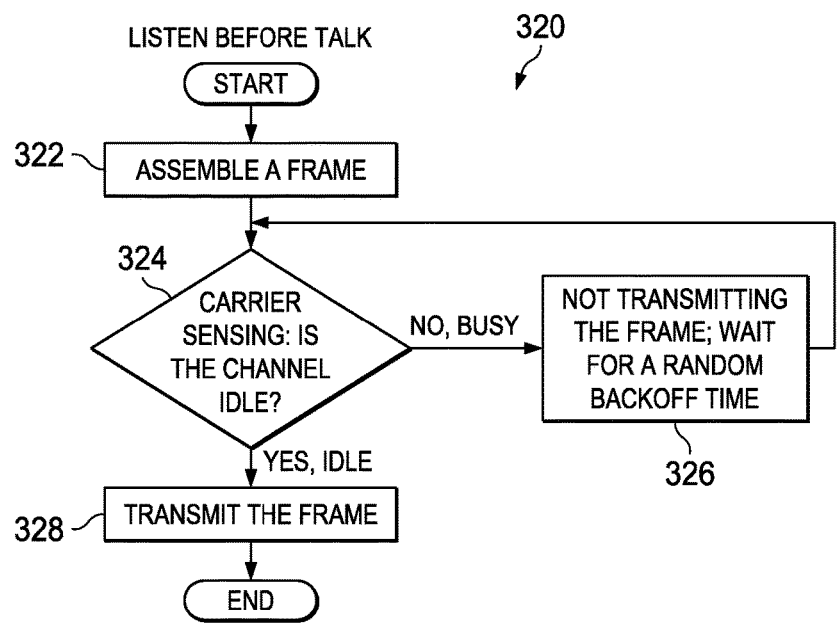
FIG. 3C illustrates an embodiment of Listen-before-talk mechanism in unlicensed band.

Referring now to FIG. 3C, the method 320 begins at step 302 where the communication controller assembles a frame. At step 304, the communication controller performs carrier sensing, such as described above with reference to FIG. 3B, to determine if the channel is idle. If, at step 304, the communication controller determines that the channel is not idle, but is busy, then the method 320 proceeds to step 306 where the communication controller refrains from transmitting the frame and waits for a random backoff timer to expire, after which, the method returns to step 304. If, at step 304, the communication controller determines that the channel is idle, then the method 320 proceeds to step 308 where the communication controller transmits the frame, after which, the method ends.

Figures 3D, 5:
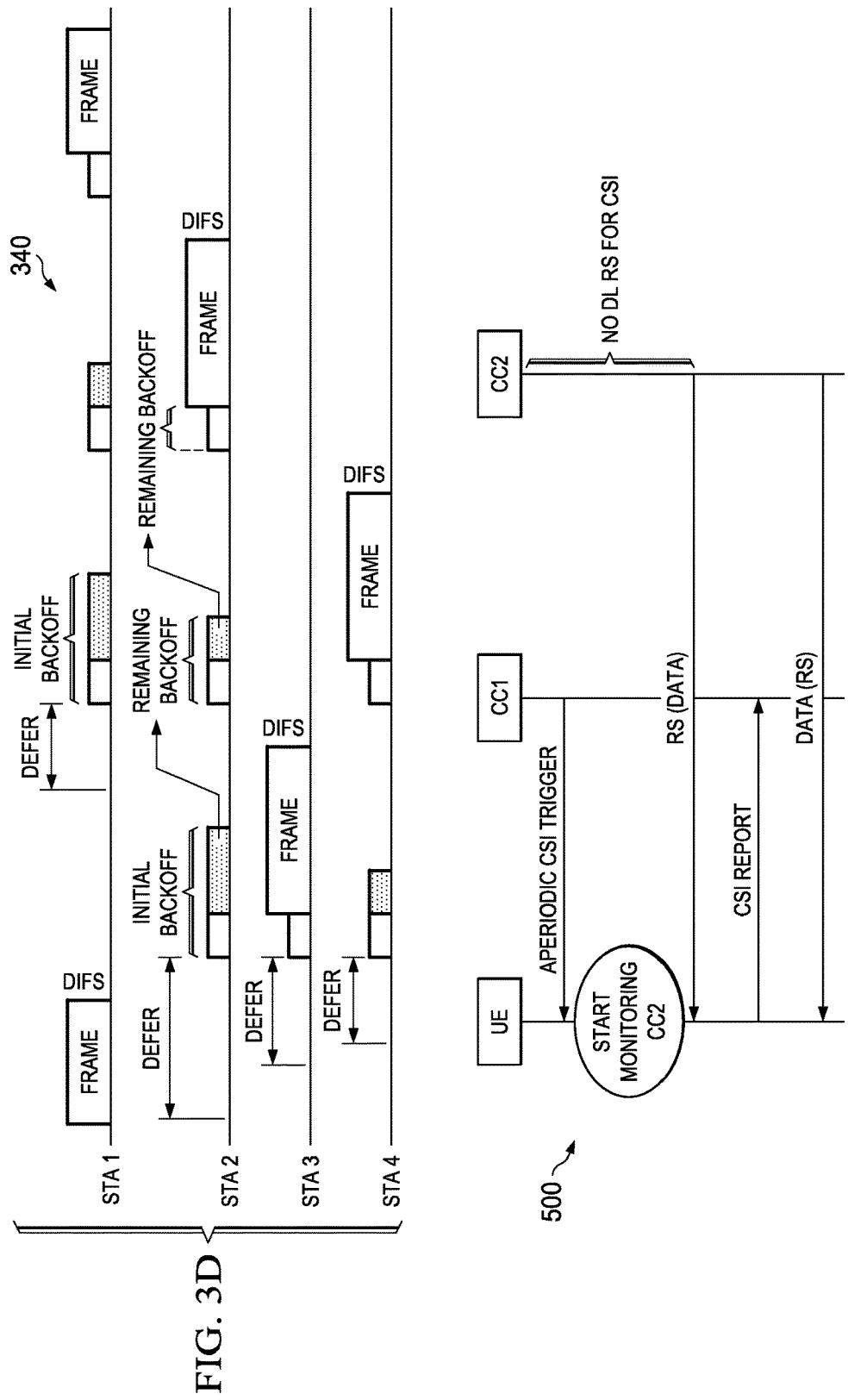
FIG. 3D illustrates an embodiment of WiFi CSMA-CA mechanism in unlicensed band.
FIG. 5 illustrates an embodiment design of CSI measurement/feedback on demand for link adaptation, based on DL RS and aperiodic CSI trigger.

WiFi is the most eminent example of applying the listen-before-talk mechanism. WiFi uses 802.11 standards technologies as air interface (including physical and $M_AC$ layer). In 802.11, the communication channel is shared by stations under a mechanism called distributed channel access with a function called DCF (distributed coordination function), which uses CSMA/CA. The DCF uses both physical and virtual carrier sense functions to determine the state of the medium. The physical carrier sense resides in the PHY and uses energy detection and preamble detection with frame length deferral to determine when the medium is busy. The virtual carrier sense resides in the MAC and uses reservation information carried in the Duration field of the MAC headers announcing impeding use of the wireless channel. The virtual carrier sense mechanism is called the network allocation vector (NAV). The wireless channel is determined to be idle only when both the physical and virtual carrier sense mechanisms indicate it to be so. A station with a data frame for transmission first performs a CCA by sensing the wireless channel for a fixed duration, i.e., the DCF inter-frame space (DIFS). If the wireless channel is busy, the station waits until the channel becomes idle, defers for a DIFS, and then waits for a further random back-off period (by setting the back-off timer with an integer number of slots). The back-off timer decreases by one for every idle slot and freezes when the channel is sensed busy. When the back-off timer reaches zero, the station starts data transmission. The channel access procedure 340 is shown in FIG. 3D.

To meet the regulatory requirements of operating in the unlicensed spectrum and to co-exist with other radio access technologies (RATs) such as Wi-Fi, the transmissions on the unlicensed spectrum cannot be continuous or persistent in time. Rather, on/off, or opportunistic transmissions and measurements on demand may be adopted.

In addition, for operations in high-frequency bands, especially in the bands at 28 GHz to 60 GHz (or even up to 73 GHz and higher), they generally belong to the mmWave regime, which has quite different propagation characteristics from microwave (generally below 6 GHz). For example, mmWave experiences higher pathloss over distance than microwave does. At some frequency additional losses due to oxygen/air absorption and so on may also become non-negligible. In addition, at high frequency, the wavelengths, antenna sizes, and antenna spacing can all be smaller than those at low frequency; one direct consequence is that the antenna element at the receiver captures much less energy than that at lower frequency. These factors may significantly reduce the range of mmWave coverage. Therefore, high-frequency bands are more suitable for small cell operations than macro cell operations, and they generally rely on beamforming with a large number of antennas (e.g. >16, and sometimes maybe even a few hundred) for effective transmissions. Note that at high frequency, due to the small wavelengths, antenna sizes, and antenna spacing it is feasible to equip a node with a large number of antennas. As a result, the beams formed by the large number of antennas can be very narrow, for example, with beamwidth of 10 deg or even less. In sharp contrast, in traditional wireless communications, beamwidth is generally much wider, such as tens of degrees. In general, it is regarded that narrow beams are a feature of mm Waves. As a general rule of thumb, the beamforming gain by massive MIMO can be roughly estimated by N×K, where N is the number of transmit antennas and K the receive antennas. This is because the 2-norm of the channel matrix H scales roughly according to $(N \times K)^{1/2}$ and therefore if the precoding vector by the transmitting node is p, and the combining vector by the receiving node is w, then the composite channel is w'Hp, and by properly selecting w and p, the composite channel gain in energy can attain N×K, much higher than the case with fewer antennas. Currently most of the mmWave bands are not assigned as dedicated licensed carriers for cellular communications, but some of the bands can be usable by cellular as unlicensed carriers. In future more and more mmWave bands may be usable by cellular, either as unlicensed carriers or licensed carriers.

Thus, it can be seen that when considering further evolution of the small cell networks, the main scenarios may be small cell networks with abundant resources in both node-density dimension and spectrum dimension, where the spectrum resources may be in low-frequency (sub-3 GHz or sub-6 GHz) and/or high frequency (above 6 GHz or even above 28 GHz), and/or in unlicensed/shared-licensed/licensed bands. Specifically, the case where LTE operating on unlicensed spectrum is called unlicensed LTE (U-LTE) or LTE on unlicensed (LTE-U) or licensed-assisted access using LTE (LAA-LTE). In these scenarios, the small cells are generally overlaid with wider-area macro cells. Such scenarios may be called hot areas, which indicate enlarged areas as compared to hot spots. Such hot areas are generally deployed and controlled by the network operators. For such hot areas, discontinuous, opportunistic, or on-demand transmissions (and reception) and measurements (of signals and/or various types of interference) on flexibly selected resources are needed.

An embodiment method is adaptive resource selection. In other words, the network may adaptively select a subset of cell and/or carrier resources to be used for a UE. As there are more node resources and spectrum resources to be included in the network, from the UE perspective, it can discover multiple "cells" (a licensed component carrier, or CC, is generally viewed as a cell according to carrier aggregation; other nodes or carriers may be viewed as virtual cells or generalized cells with virtual cell IDs which may or may not be related to physical cell IDs). These cells may be configured for the UE (in slow time scale, for example), but not all will be used. The network selects a subset of the cells and signals to the UE (e.g., via RRC or MAC signaling, or via physical layer signaling for fast response). If a cell is not selected for any UE, it may be turned off and transmit only in a discovery burst (discovery RS burst, or DRS burst). If a cell is selected, the cell has to be on or turned on. The transition time is desirable to be as short as possible. In one embodiment, the bandwidth of a cell is not predetermined, but determined when it is selected for use or determined on the fly of the transmissions. For example, the cell and/or the UE may sense the usage of the spectrum and then decide on a portion of the spectrum which is less occupied.

Network adaptation, or adaptive transmission, has been studied in 3GPP, such as small cell on/off based on existing procedures. However, the main focuses have been reusing existing procedures, such as handover, Scell activation/deactivation, and dual connectivity procedures, to achieve small cell on/off in semi-static time scales. The on/off may be in a couple tens of milliseconds to hundreds of milliseconds. Faster or more dynamic on/off, or highly opportunistic transmission/reception/measurements with reduced on/off transition times (transition delays) are highly desirable, as they offer even higher performance gains and it is potentially necessary for U-LTE support and mmWave opportunistic usage. Thus, procedures and designs to support dynamic on/off at any time are desired. Generally, such cells may be activated Scells. In some cases, the cells can just be a configured Scell, activated or deactivated.

Compared with small cell on/off based on legacy procedures (e.g., handover, Scell activation/deactivation), small cell on/off based on the embodiment L1 procedure may have its distinct properties, scope, target, and scenarios.

Small cell on/off based on the embodiment L1 procedure may not rely on legacy procedures (handover and Scell activation/deactivation) for on/off. In addition, the embodiment L1 procedure may limit its standards impacts mainly to the physical layer, and it may not lead to significant impacts on higher layers (MAC, RRC, etc.), as in general the physical layer is more dynamic and flexible than higher layers. However, necessary supports by higher layers may not be precluded.

The embodiment L1 procedure may result in reduced transition times compared to on/off based on existing procedures such as handover or Scell activation/deactivation. The embodiment L1 procedure may lead to fast on/off, whereas on/off with the existing procedures falls into the category of semi-static on/off.

According to 3GPP 36.133, if a valid RRM measurement is available, then an activation time less than 24 ms can be feasible based on existing Scell activation/deactivation. The 24 ms includes 4 ms MAC CE decoding time and at least 4 subframes of DL transmission. In the case of TDD carrier with TDD configuration 0, it takes 20 ms for the UE to receive 4 DL subframes. In FDD cases, it takes only 4 ms for the UE to receive 4 DL subframes, so a transition time of faster than 24 ms can be feasible with the legacy Scell activation procedure.

The embodiment L1 procedure may lead to faster transitions (otherwise, the network can just rely on Scell activation/deactivation procedure). As concluded in 3GPP TR 36.872, reduced transition times lead to better performance. Therefore, subframe-level Scell on/off, if achievable with high reliability without considerably increasing UE complexity, may be considered. The feasible transition time scale will be analyzed later. Thus, it is desirable to target the transition time to be no longer than the duration of one radio frame (10 ms) in the worst case, and subframe-level transition is desirable and may also be supported.

Different scenarios may mandate different requirements and different designs. Part or all of the following scenarios may be considered for the embodiment L1 procedure: 1) Co-located versus non-co-located: The Scell operating fast on/off may be co-located or non-co-located with the Pcell; 2) Inter-band CA versus intra-band CA: The Scell operating fast on/off may be in a different band or the same band as the Pcell, and in the intra-band case, the carriers for the Scell and Pcell may be contiguous or non-contiguous; 3) Synchronized versus un-synchronized: The Scell operating fast on/off may be time-synchronized or un-synchronized as the Pcell.

Both the design complexity and applicability of the embodiment L1 procedure may be considered when defining the scenarios. At least the co-located and synchronized scenarios in both inter-band and intra-band may be considered, and un-synchronized scenarios may also be studied. Therefore, synchronized scenarios may be addressed first, and then un-synchronized scenarios may be addressed by further considering time/frequency tracking issues and related UE behavior issues.

How the Scell On/Off states are conveyed to the UE affects the UE complexity and reliability. For example, utilizing DCI to convey the On/Off states does not considerably increase the UE complexity since the UE can already perform such operations. Furthermore, if the DCI is sent from the Pcell only, then the UE complexity for receiving the indication is regarded as low since the UE does not have to monitor the Scell all the time. In addition, using signals similar to existing ones (e.g. PDCCH/PDSCH) to carry the indication is regarded as reliable since their transmissions are well protected by existing mechanisms.

On the other hand, the UE complexity is regarded as considerably increased if the UE needs to autonomously detect whether a subframe is in the On state or Off state, in every subframe for all activated Scells. The UE autonomous detection usually involves blind detection of RS (e.g. CRS) and/or (E)PDCCH, and in some cases the UE may need to hypothesize on the detection of the RS for its further (E)PDCCH decoding attempts. As a result, the reliability of the UE autonomous detection may not be consistent and depend on various factors, such as the channel quality, UE implementation of the blind detection, channel estimation result, synchronization accuracy between the UE and Scell, etc. A missed detection caused by any of the factors may be mistaken by the UE as the Scell being in the Off state.

Therefore, an embodiment L1 signaling may be introduced for the embodiment L1 procedure to indicate the On/Off states of a Scell. This can support Scell fast on/off at any subframe with low UE complexity and high reliability (depending on the specific design).

To enable time/frequency tracking and automatic gain control at off to on transition, the time/frequency tracking may highly depend on the scenarios (e.g., synchronized or not) for which the embodiment L1 procedure is designed. When the time-synchronized scenarios are considered, the time/frequency tracking of Scell can rely on the Pcell and no time needs to be spent on tracking during the off-to-on transition. For the case where un-synchronized or coarse synchronized carrier is assumed, some time may be allowed to achieve time/frequency tracking, and the exact number of subframes for initial time/frequency tracking depends on the design, such as the discovery reference signal (DRS) design. For example, if the DRS design is such that the timing obtained from one DRS occurrence can be maintained (e.g., within 3 us) till the next DRS occurrence, then zero subframe for initial time tracking is needed; otherwise more than one subframe may be needed.

The transition delay caused by RF tuning (assuming RF is on) and AGC settling has been studied. From these related studied one may estimate that the delay caused by RF tuning and AGC settling may be at most a couple of OFDM symbol durations of 140 µs. However, the 2 symbols of 140 us may be a loose upper bound in the activated Scell fast on/off case if periodic DRS/CSI-RS can be transmitted. The typical delay may be 0 symbol in such cases, or at most 1 symbol in some case. This is because the UE can base its RF and AGC on the latest DRS/CSI-RS. Note that this requires a standardization support, i.e., the standards need to require the UE set its RF/AGC based on the latest DRS/CSI-RS, which is a new UE behavior. As generally the DRS periodicity is tens of milliseconds and CSI-RS periodicity is 5 ms and tens of milliseconds, at least the analog AGC remains valid, and the digital AGC can be adjusted digitally without causing any extra delay. To summarize, in the case with low UE mobility, synchronous networks, and periodic DRS/CSI-RS transmissions with sufficient densities in time, the transition time needed for time/frequency tracking, RF tuning, and AGC settling may be negligible, and a simplified design may be feasible. In other cases, additional designs are needed to account for the transition times.

Figure 8:
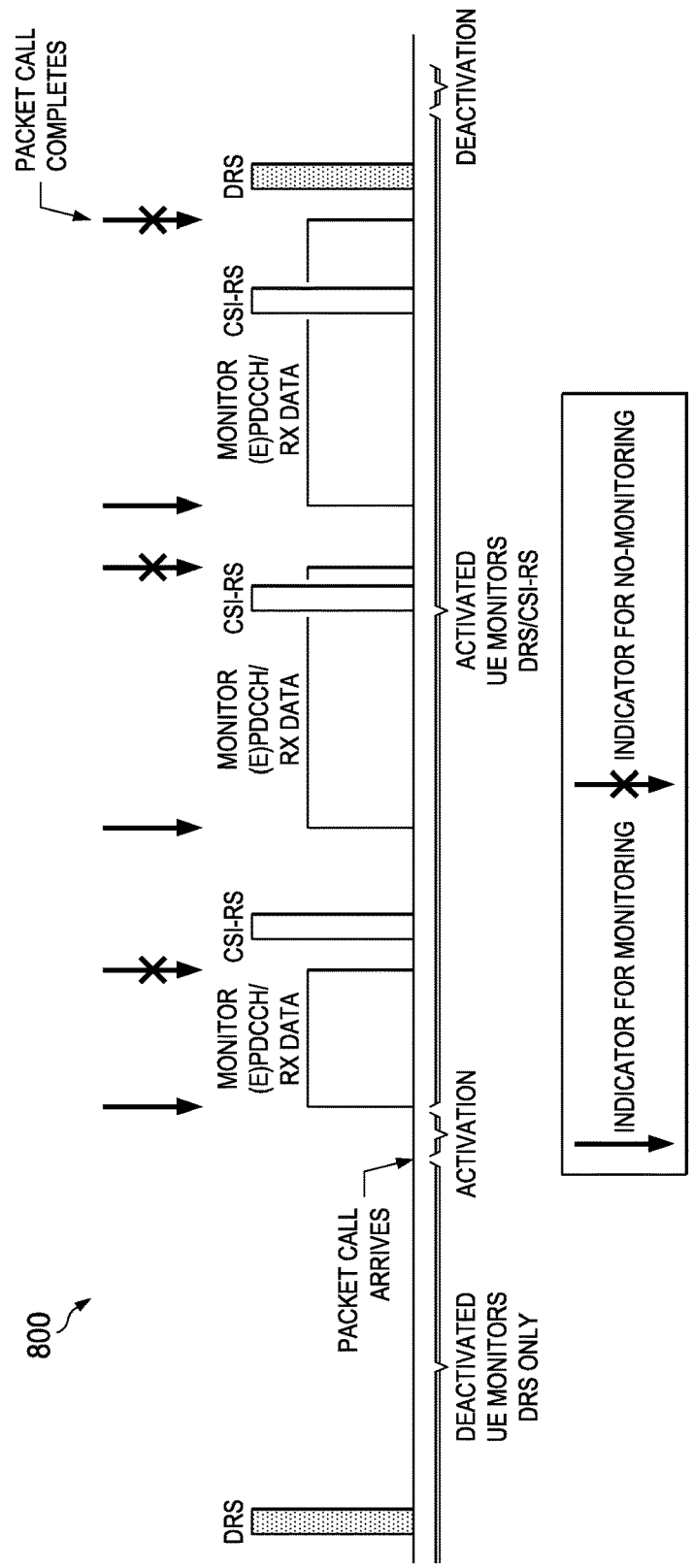
FIG. 8 illustrates an embodiment procedure for monitoring UE behavior.

FIG. 8 is a diagram of an embodiment of a layer one procedure 800. The UE does not monitor the activated Scell except for subframes containing DRS or periodic CSI-RS or periodic CRS (whose presence and periodicity are configurable), unless it receives an indicator for starting monitoring of the Scell. After the UE receives the signaling, it starts monitoring for (E)PDCCH and may receive data for a number of subframes. Finally, the UE stops monitoring the Scell after it receives an indicator for stopping monitoring of the Scell.

To support small cell off-to-on transition at any subframe with low UE complexity and high reliability, the Scell off-to-on indicator may be sent from the Pcell which, in many embodiments, the UE always monitors. For the case of Scell on-to-off transition, some kind of implicit indication may be possible. For example, the stop-monitoring indicator may be implicit based on the absence of (E)PDCCH for a certain amount of time. However, in some cases, it may be simple and beneficial to have a unified solution for off-to-on and on-to-off indication. Therefore it may be considered to also use explicit DCI message for both Scell off-to-on and Scell on-to-off indication, such as an indication bit is used. When the indication bit is set for the Scell, then it indicates the Scell is turning on; otherwise the Scell is turning off. A bitmap can be formed and sent from the Pcell to indicate the state transitions of multiple Scells, and the mapping between the bits and the Scells can be predefined in RRC signaling. One more bit can be added for each Scell if needed, such as to indicate the state changes of the Scell in addition to directly indicating the on/off state. This may be needed since for the same Scell, UEs attached to it may have different states (monitoring or not monitoring). Only transmitting the on/off state of the Scell will force the UEs to start or stop monitoring upon receiving the indicator, but in some cases this is not desired if the network just wants the UEs to maintain their current states. For example, bit 1 is used to indicate if the UEs may keep their current states or update according to bit 2, and bit is used to indicate the on/off. Alternatively, the Scell identifier may be carried with the indicator. For example, the eNB may indicate with one or two bits that Scell 1 is turning on, turning off, or UE may keep or flip their current states. Another embodiment is just to indicate if the states need to be flipped or kept without indicating the on/off states; however this may have the drawback that if a UE misses one indicator, it may not work correctly since then. For example, the eNB may indicate with one bit of whether the UEs may keep or flip their current states. To summarize, various embodiments can be provided to signal the possible states: turning on versus turning off, and flipping the current states versus maintaining the current states. One or more of the states may be indicated.

With the above design, the UE starts monitoring the Scell's RS/(E)PDCCH upon receiving the On-state indication from the Pcell, and it stops monitoring the Scell upon receiving the Off-state indication from the Pcell. The On-state indication may be an explicit DCI signaling, or a Scell activation signaling. The Off-state indication may be an explicit DCI signaling, or a Scell deactivation signaling. The On/Off state indicators serve as the monitoring indicator and no-monitoring indicator for the UE. (Note that, however, the subframes with configured DRS/CSI-RS are always monitored by the UE when the Scell is activated for the UE.) One embodiment of the procedure and UE monitoring behavior is illustrated in FIG. 8. Note that the monitoring/no-monitoring indicators may be explicit or implicit. An embodiment of the no-monitoring indicator may be based on a timer of inactivity. Another embodiment of the indicators may be based on DRX configuration, i.e., when the UE enters the DRX, it stops monitoring, and when it enters On-period and in active time of the DRX cycle, it monitors the carrier. The DRX based embodiment and non-DRX based embodiment may be combined. In the monitoring period, UE may receive PDSCH based on self or cross-carrier (E)PDCCH scheduling. In the subframe scheduled by (E)PDCCH, UE monitors PDSCH and CRS/enhanced RS. In other subframes of the monitoring period, in one design, CRS may still be present for backward compatibility (i.e., the UE's assumption on the carrier is the same as in Rel-11), but in another design, CRS may not be present (i.e., the carrier acts as a embodiment carrier type) in all non-PDSCH subframe or in all non-PDSCH/CSI-RS subframes. In the no-monitoring period, the UE monitors only DRS and CSI-RS on the configured subframes on the Scell, respectively. However, on the CSI-RS subframes, CRS may still be present for backward compatibility or not present as a embodiment carrier type. Other than these, no transmissions may be monitored during the no-monitoring period. However, the above-mentioned UE monitoring and no-monitoring operations are mainly for the Scell performing on/off; it should be noted that the UE always monitors the Pcell and other Scells not performing on/off. Therefore, it is feasible that the UE can always receive indication and/or scheduling information from the Pcell (or another Scell) about a Scell regardless of the on/off state of the Scell. The indication/cross-carrier scheduling may be UE specific. It may inform the UE to monitor the current subframe of the Scell but not the next subframes (which may be useful for a short burst of data, or for providing the UE an opportunity to measure the Scell channel, update timing, etc.), or inform the UE to monitor (or not to monitor, resp.) the Scell from the current subframe until otherwise notified (which may be useful for altering UE monitor behaviour in a UE-specific way, instead of a UE-group-specific way). So even if the explicit DCI indicates no monitoring, upon receiving the cross-carrier indication or scheduling information about monitoring, the UE will operate according to the indication/scheduling information. Overall, this provides greater flexibility for the network. If subframe boundaries between the Pcell and Scell are aligned, then the UE has to buffer the Scell subframe (or at least the first several symbols) while the UE attempts to detect Pcell control signalling. If, however, the subframe boundary of the Scell lags that of the Pcell, then the UE can just start buffering the Scell after finding the indication/scheduling information from the Pcell.

The UE may start monitoring the Scell's RS/(E)PDCCH on the subframe where it receives the off-to-on indicator in DCI. There can be a brief transition time needed for the UE to receive from the Scell. In the cases with synchronized carriers and periodic DRS/CSI-RS transmissions, no time is needed for tracking, RF tuning, or AGC settling. However, one OFDM symbol duration may be needed for the indicator detection. That is, the UE may receive from the Scell starting from the 3rd OFDM symbol of the first subframe of the transition. On the other hand, if the UE is not synchronized with the Scell, and/or RF tuning and AGC settling is needed, it needs to receive some signals (e.g. CRS/PSS/etc.) from the Scell for some longer duration before it can decode (E)PDCCH or receive data.

An embodiment is that the frame structure is designed based on 2 OFDM symbol duration for transition, and the Scell subframe boundary is aligned with the Pcell subframe boundary. That is, the DCI is transmitted on the Pcell on the first OFDM symbol, and the UE detection/decoding of the DCI takes up to one OFDM symbol duration. No other transition time is needed. Then the Scell transmission can start on the $3^{rd}$ OFDM symbol. Though PDCCH cannot be transmitted on this Scell subframe, EPDCCH can. Before the $3^{rd}$ symbol, for REs not scheduled with any transmission according to legacy standards, the Scell can transmitted anything, which may be used for fine synchronization, RF tuning/retuning and AGC settling if needed.

An embodiment is that the frame structure is designed based on 3 OFDM symbol duration for transition, and the Scell subframe boundary is aligned with the Pcell subframe boundary. That is, the DCI is transmitted on the Pcell on the first OFDM symbol, and the UE detection/decoding of the DCI takes one OFDM symbol duration, and then the Scell transmits signals (but not data) on the $3^{rd}$ symbol. Data is transmitted from the $4^{th}$ symbol, and the control information can only come from other cells (e.g. Pcell). The signals transmitted by the Scell on the $3^{rd}$ symbol can contain RS if fine synchronization is needed, and any signal if RF tuning/retuning and AGC settling is needed.

An embodiment is that the frame structure is designed based on 5 OFDM symbol duration for transition, and the Scell subframe boundary is aligned with the Pcell subframe boundary. That is, the DCI is transmitted on the Pcell on the $1^{st}$ and possibly $2^{nd}/3^{rd}$ OFDM symbols, and the UE detection/decoding of the DCI takes one OFDM symbol duration, and then the Scell transmits CRS on the $5^{th}$ symbol, as transmitted according to legacy standards. Data is transmitted from the $6^{th}$ or even $7^{th}$ symbol, and the control information can only come from other cells (e.g. Pcell). Before the $6^{th}$ symbol, for REs not scheduled with any transmission according to legacy standards, the Scell can transmitted anything, which may be used for fine synchronization, RF tuning/retuning and AGC settling if needed.

An embodiment requires the UE to monitor each subframe after the Scell is activated. Therefore, the UE buffers each Scell subframe (but no further operation/processing is needed until Pcell DCI detection result is available) while it attempts to decode the Pcell DCI. If the Pcell DCI for the Scell to be turned on is not detected, the buffered subframe is discarded; otherwise the subframe is further processed and every symbol can be used for data transmission.

An embodiment shifts the Scell subframe boundary so that it lags the Pcell subframe boundary for a fixed amount of time. The offset can be chosen as the maximum transition time. For example, if one symbol is needed for DCI transmission, one for DCI detection, and one for AGC settling, then 3 symbol offset can be applied. Note that although the Scell subframe starts 3 symbols later than the Pcell, the Scell can transmit signals (e.g. RS for AGC settling) one subframe before the Scell subframe boundary, i.e., the symbol right after the UE completes DCI detection. The UE needs to start receiving right after the DCI is detected and receives the last symbol of the subframe from the Scell. Then when the next subframe of the Scell starts, the UE can have its AGC (or timing, or RF, etc.) correctly set, and the next subframe is a complete subframe with (E)PDCCH/RS/etc. The fixed offset in terms of the number of OFDM symbols may be sent to the UE in RRC signaling or system information when the Scell is added to the UE. The UE shall apply the offset for any cross-carrier indication if the two carriers are configured with such an offset. In one embodiment, the cells on each layer have aligned subframe boundaries, but the small cell layers (capacity layers, U-LTE layers, etc.) is lagging the macro layer (coverage layer) by a fixed offset.

An alternative is to use implicit indicator. In this case, the Pcell does not send any explicit indicator regarding the on/off state. The UE monitors every subframe, and detects if there is RS and/or (E)PDCCH for it on this Scell. There may be cases where RS is detected but no (E)PDCCH for this UE is detected, and the UE can update its measurements (CSI measurements and/or RRM measurements), and also the RS can help the UE with time/frequency tracking and AGC. There may be cases where (E)PDCCH for this UE is detected but no RS is detected except for DMRS used for demodulation, where the DMRS may be signaled to quasi-co-located with the RS detected elsewhere on the Scell (such RS may be part of the enhanced RS, which will be further discussed later) or a specified DRS. There may be cases where RS is detected and (E)PDCCH for this UE is detected, and the UE can update its measurements (CSI measurements and/or RRM measurements), the RS can help the UE with time/frequency tracking and AGC, and the RS may be used for demodulation of the PDCCH and possible the data.

For either the explicit indicator or the "implicit indicator", the network may further restrict on which subframes the indicator may be sent, thus reducing the UE's monitoring times. The cases with a FDD Pcell and TDD Scell, and FDD Pcell and TDD eIMTA Scell, and TDD Pcell/Scell, etc., may be considered. For example, the turning-on transition may only occur in subframe 0 (and subframe 5), and hence the indicator may be sent only on subframe 9 (and subframe 4). A longer delay between the indicator and the turning-on transition may also be used, such as 2 or 4 subframes. If the subframe after the delay is not a DL subframe, then the turning-on will occur on the first DL subframe after the delay.

Figure 4:
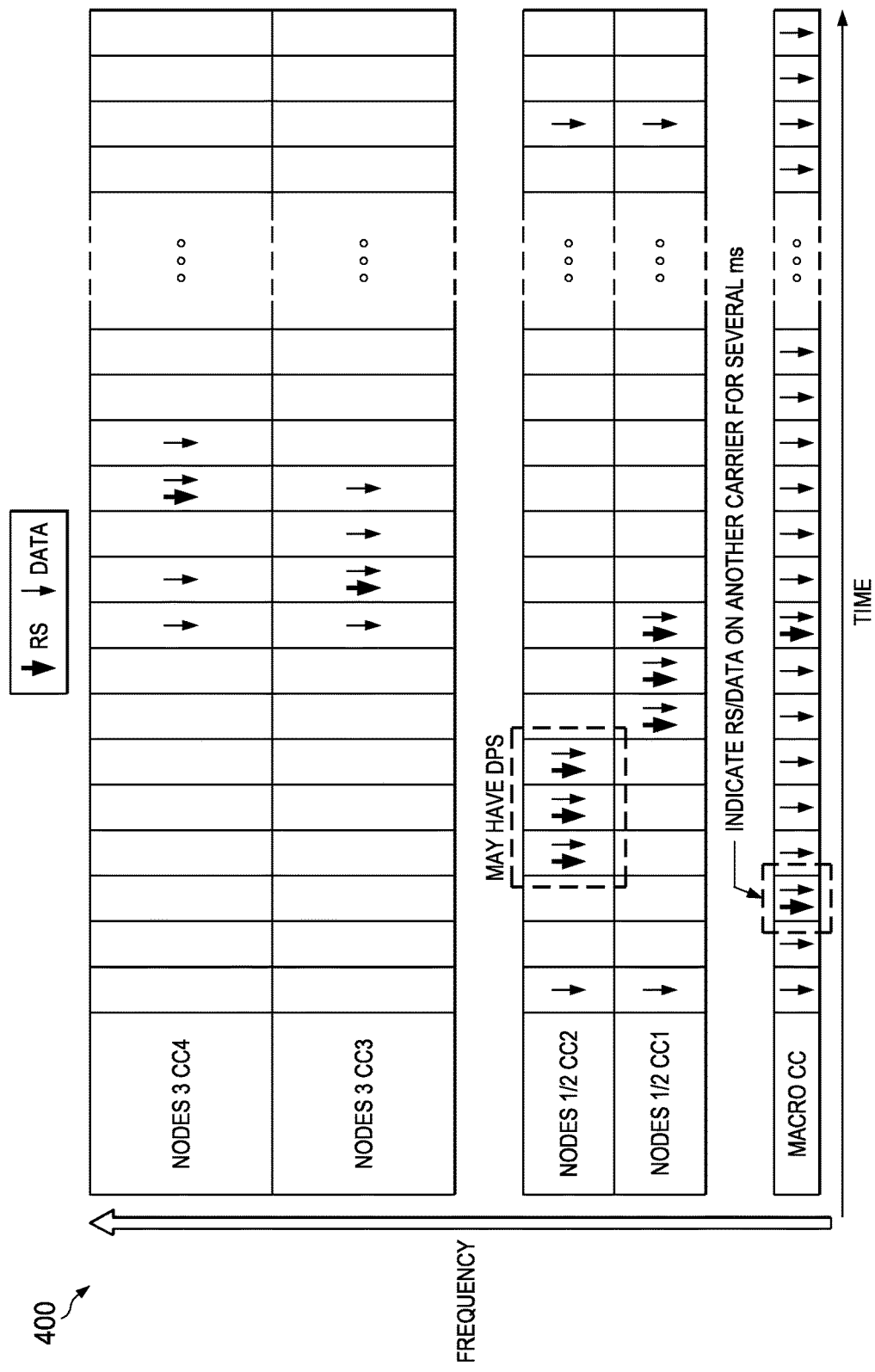
FIG. 4 illustrates an embodiment of adaptive resource selection and opportunistic transmission/measurements.

FIG. 4 is a diagram illustrating an embodiment of adaptive resource selection and opportunistic transmission/measurements 400. The macro carrier normally acts as the Pcell, and does not turn off. It transmits CRS and other common channels regularly. The UE generally always monitors the macro CC for CRS, common channels, signaling related to other CCs, and possibly data. Besides the macro CC, the UE has discovered a number of cells (e.g., by DRS) and some of them may be configured to the UE as possible transmission points. Node1 and node2 may be small cell operating in licensed spectrum, and each may have more than one CC, e.g., CC1 and CC2. They may be connected via fast backhaul. They may transmit DRS regularly with long duty cycles. They may be turned off in non-DRS burst unless a measurement/transmission is needed. For example, the macro may indicate that in a next subframe (with delay of 0 subframe, 1 subframe, or more subframes), node 1 and/or node 2 may transmit RS and/or data in CC1/CC2. Then the nodes may be turned on and the UE starts to monitor and feedback CSI reports.

Depending on the channel quality, interference coordination purposes, load balancing/shifting, etc., dynamic point selection (DPS, or DPB for dynamic point blanking) may be performed. Different from DPS used in Rel-11 CoMP, here the RS transmission may be turned off if a cell is not selected, and the RS transmission may be turned on if a cell is selected. The scheduling information may be from the macro or any of the cells, but signaling may be sent from a transmitting cell to indicate how the UE may receive the scheduling information, such as in a subset of the cells in the next few subframes. Similarly, a cell may further indicate the UE to monitor cells on unlicensed spectrum (e.g. node 3 CC3 and node 3 CC4). These cells generally do not use periodic measurements, so aperiodic measurement may be triggered to provide link adaptation capability. Usually the measurement may precede the data transmission on the unlicensed cell, but they may also be transmitted at the same time when the cell is selected, with possibly higher decoding error probability or with conservative data transmissions until the measurement result is obtained by the network.

FIG. 5 is a diagram illustrating an embodiment method 500 for design of CSI measurement/feedback on demand for link adaptation. In FIG. 5, CC1 may be a carrier that the UE is monitoring (e.g., CC1 may be Pcell or an activated Scell). CC2 is an opportunistically on/off cell and has fast backhaul with CC1. There may not be DL RS for CSI measurements and reporting sent by CC2 when it is not selected. To support transmission on CC2, CC1 may transmit an aperiodic CSI trigger for CC2. In the same time, CC2 may start RS transmission. Upon receiving the trigger, the UE starts monitoring CC2 (and possibly data). An aperiodic CSI report may be generated and sent to the network (e.g. CC1). With the CSI report, CC2 can perform link adaptation for its transmissions accordingly. Then the operations between UE and CC2 may be similar to existing ones, such as periodic RS for CSI measurements may be transmitted, and periodic CSI reporting may be performed. Alternatively, the UE may rely on RS detection to determine the presence of RS. One can see that even though the aperiodic trigger may reuse the one defined in current spec, it still leads to different UE behaviors as in the old scenarios, the UE has received RS for its CSI measurements, but a measurement report may not be generated or reported until the trigger is received; whereas in the embodiment scenarios, the UE may not receive RS for its CSI measurements until the trigger is received.

The aperiodic CSI trigger may contain more information than the existing one. For example, it may tell the UE at least how long the UE may monitor CC2 (e.g., it may tell the UE to monitor at least 5 subframes, but for UE still receiving data on the $5^{th}$ subframe, the UE can keep monitoring after those 5 subframes). The turning on or CC2 may not be for only one UE; a number of UEs may need to receive the trigger. In this case, group DCI may be used to trigger measurements and reporting by a number of UEs. The trigger may also be used for specifying more than one cell. For example, it may ask a group of UEs to monitor several cells.

Figure 6:
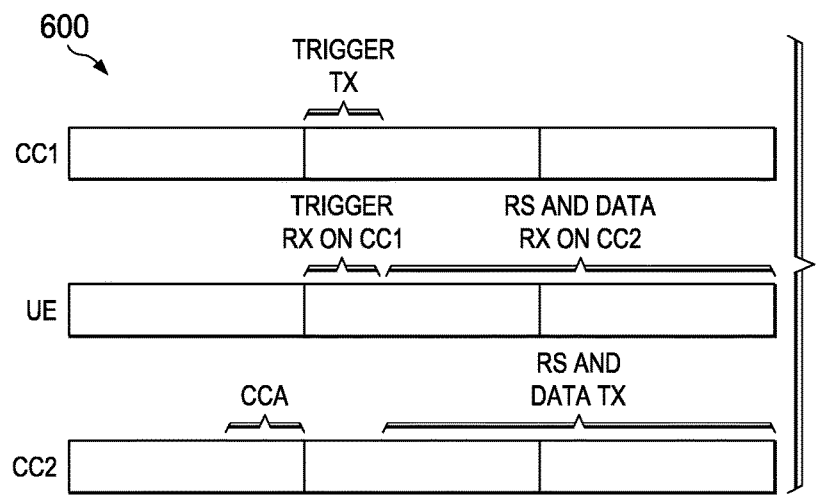
FIG. 6 illustrates an embodiment design of CSI measurement/feedback on demand in U-LTE, based on DL RS and aperiodic CSI trigger, with aligned subframe boundaries.

FIG. 6 shows an embodiment system 600 of CSI measurement/feedback on demand for link adaptation, operating in U-LTE. The CC1 may be a cellular cell that the UE is monitoring, and CC2 may be an opportunistically on/off cell operating on unlicensed carrier and has fast backhaul with CC1 (e.g., CC1 and CC2 are collocated). There is generally no DL RS for CSI measurements and reporting sent by CC2 when it is not selected. Besides, CC2 cannot transmit until it senses no transmission on that unlicensed carrier for a period of time; i.e., CC2 has to perform clear channel assessment (CCA) before using the channel.

To support transmission on CC2, first CC2 may perform CCA in the last few OFDM symbols of a subframe. If the channel is clear, then CC1 may transmit an aperiodic CSI trigger for CC2; otherwise CC2 may repeat the CCA for a consecutive number of subframes. Generally the trigger is transmitted by CC1 in its PDCCH in the subframe following a successful CCA, and then the UE may detect and decode that trigger in at most a few symbol durations. Then starting from symbol x in that subframe which is no earlier than the end of the trigger, CC2 may start RS transmission. Upon receiving the trigger, the UE starts monitoring CC2 (and possibly data). An aperiodic CSI report may be generated and sent to the network (e.g. CC1). With the CSI report, CC2 can perform link adaptation for its transmissions accordingly. In an embodiment CC2 may need to reserve the channel after CCA. CC2 may also perform CCA until the first few symbols of the subframe that the trigger is sent, and transmit RS immediately after the CCA. The trigger may be alternatively transmitted in CC1's EPDCCH, which occupies last symbols of a subframe but normally not the first few symbols. In this case the CCA and the EPDCCH containing the trigger may be done in one subframe. Then the RS/data transmission can only start from the subframe after the EPDCCH. To make sure that the UE has time to detect and decode EPDCCH and prepare for monitoring CC2, the RS/data transmission may avoid the first few OFDM symbols of that subframe. CSI-RS may be a suitable candidate for the DL RS. Alternatively, if CRS is to be used, it may be transmitted only in the second slot in that subframe.

It should be pointed out that, although the above description such as FIG. 8 is based on the assumption that the CCA is at the end of a subframe, and the next subframe starts without CCA but just control/data transmissions, the definition of subframe boundary can also be modified so that the CCA is viewed as at the beginning of a subframe. The resulting frame structure is similar, except for the range of OFDM symbols that a PDCCH/EPDCCH is associated with is reduced. This variation can be applicable to above and all below embodiments of frame structures.

Figure 7:
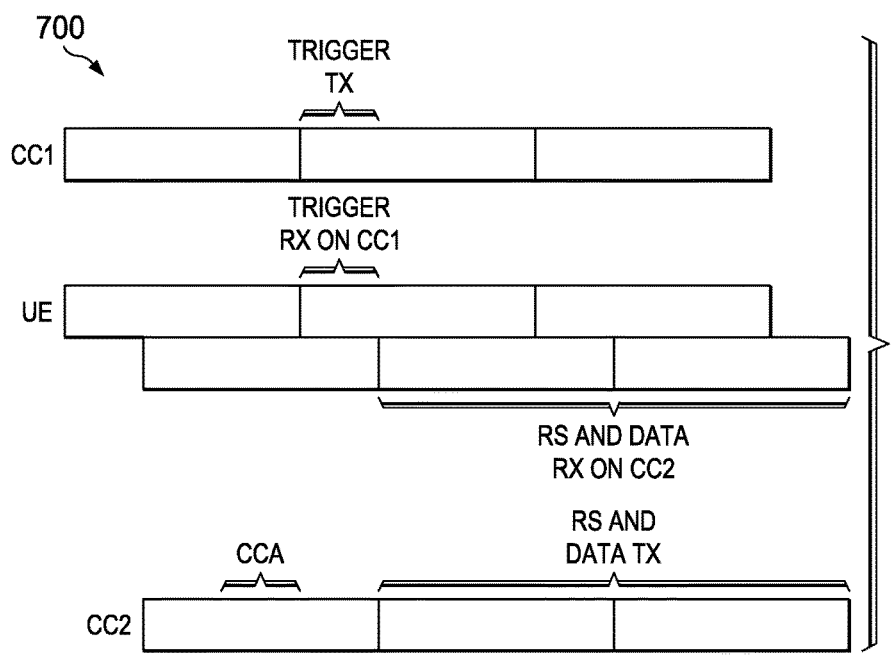
FIG. 7 illustrates an embodiment design of CSI measurement/feedback on demand in U-LTE, based on DL RS and aperiodic CSI trigger, with shifted subframe boundaries.

Note that the RS and possible data transmission may not occur in the first few symbols of the subframe of CC2. In other words, every time CC2 starts this procedure, a few symbols may be lost. If such opportunistic transmissions occur frequently and each transmission is not long, the overhead may be high. Alternatively, CC2 may be time-shifted from CC1, as shown by system 700 in FIG. 7. For simplicity, the shift may be a slot, but it can be other durations such as one or more OFDM symbol durations. Then RS and possibly data can be sent in the subframe by CC2 immediately after the trigger is sent. The UE receives the trigger from CC1 (based on CC1 subframe timing), and it starts to buffer the subframe of CC2 immediately after that for RS and possibly data. The licensed carriers may have the same subframe boundaries (subject to allowable timing errors), and the unlicensed carriers use the licensed as reference timing, but with a (possibly common) shift of the subframe boundaries. Therefore, at the cost that the network and UE maintain two timings (though related), the unlicensed subframes can be fully utilized.

In an embodiment, the DL RS may be enhancement to better suit the dynamic on/off schemes. For DRS generally used for RRM measurements, in systems like U-LTE systems, they may not be able to transmit periodically, depending on if an opportunity exists or not. One way to resolve this issue is to use trigger-based DRS (which may still be called as DRS or called as some other RS) transmission, measurement, and/or reporting. In other words, a DRS may be sent only after the eNB seizes a transmission opportunity, and the eNB can notify the UE for performing the measurement. In this case, the network may provide another indicator of whether the UE may also report the RRM measurements for this triggering instance.

Some signals included in the DRS burst may also be used for CSI measurements, tracking, etc. Nevertheless, it may still happen that when a Scell is turning on, only outdated CSI is available. An enhanced RS for CSI measurements may be used. The RS may occur as early as possible with the first subframe after the trigger. The RS may be transmitted in full power. The RS may occupy the entire bandwidth. Proper muting/orthogonalization may be used to improve the RS's SINR, such as PDSCH muting for CRS, zero-power CSI-RS for non-zero-power CSI-RS, cyclic shift for different cells on overlapped REs. One example is the cyclic-shifted enhanced CSI-RS, on the first symbols of the subframe. Such enhanced RS can significantly boost CSI measurement accuracy and tracking performance. This enhanced RS will be further discussed later. With such enhanced RS, the density of the RS in time-domain does not have to be very high to ensure reliable CSI measurements. To allow for interference measurements, IMR may also be configured on the first symbols of a subframe, such as CSI-IMR or cyclic shift based IMR. Such enhanced RS may not need to appear in every data-carrying subframe, but at least for the initial subframe(s) after the turning on they can be transmitted. They can also be periodic after the turning on but before the turning off.

Even with the enhanced RS, at the first few subframes after the turning on, no up-to-date or accurate CSI may be available. The network may rely on conservative scheduling and transmissions, such as conservative MCS and transmission schemes (such as open-loop MIMO, transmitter diversity). The MCS and transmission schemes may be updated after more reliable CSI is available, such as closed-loop MIMO or MU-MIMO. The change of transmission modes, if needed, may be indicated in DCI or specified as a fixed delay associated with the CSI availability delay (e.g. 5 ms).

The network nodes on the unlicensed carriers may need to monitor the channel usage regularly, and UEs may be configured for this as well. For these purposes, these cells may not transmit anything on some time/frequency resources. For the cells controlled by the same operator, they may mute at the same time (wideband on all channels, usually aligned with Wi-Fi channels), and no UE may transmit. This may be done periodically. A blank subframe pattern may be used, or a smaller time granularity may be used, such as slots/symbols, or a mixture of these. Existing blanking patterns such as those defined for eICIC may be reused (and the signaling mechanism as well), but instead of an almost blank subframe (ABS), a blank subframe is used. The cells sense in the muting duration, and they may sense transmissions by other U-LTE systems or Wi-Fi systems. The statistics are recorded and used by the network to coordinate resource allocation/avoidance in U-LTE systems and to access the interactions with Wi-Fi systems.

Figure 9A:
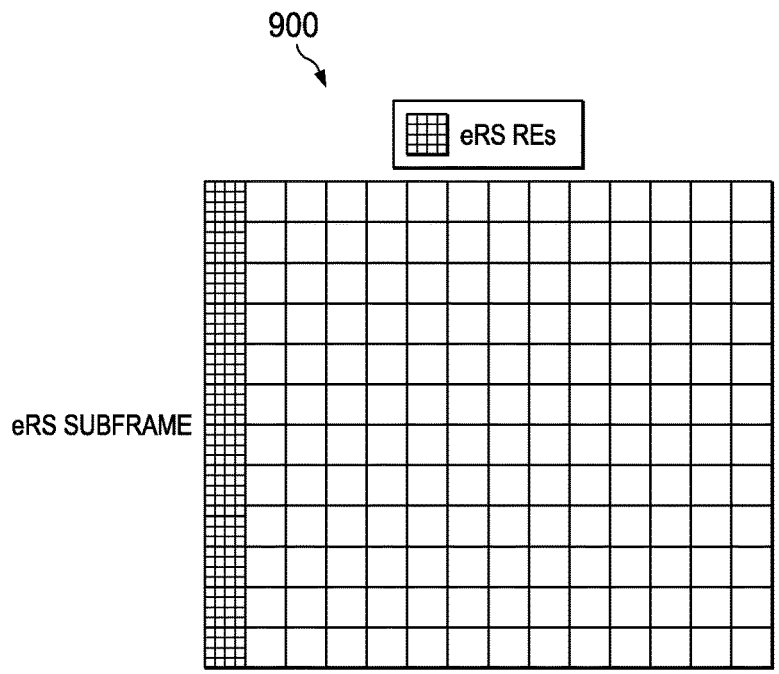
FIGS. 9A-9I illustrate embodiment designs of enhanced RS.
Figure 9B:
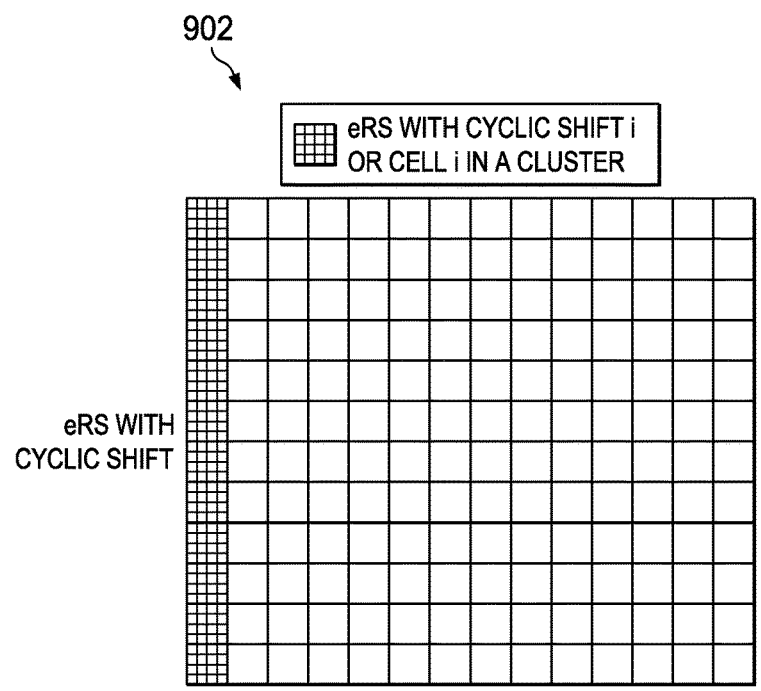

As we have seen, to support dynamic on/off of carriers in licensed or unlicensed spectrum, in low-frequency or in high-frequency, or to support LTE-like system in unlicensed spectrum, enhanced RS and associated embodiment UE behavior are critical. Further discussions will be provided here. In an embodiment, an enhanced RS (eRS) may occupy the entire bandwidth of a component carrier. The RS may be located at the first OFDM symbol of the subframe 900 as shown in FIG. 9A. The RS may be transmitted with high power and high density in frequency domain. The RS-bearing subframe may be transmitted immediately when the carrier is turned on for transmission. Note that the turning on of a carrier may be from the UE perspective. The turning on of the carrier may be indicated by another carrier using cross-carrier scheduling method or other triggering method, such as aperiodic CSI report request. The turning on may also be indicated implicitly by UE autonomous detection. The RS may be designed to help the UE quickly perform time/frequency tracking, RF retuning, and AGC adjustment. Upon receiving the trigger, the UE will perform time/frequency tracking. For this purpose, the RS may occupy every RE. If reuse becomes a potential issue within a cluster of small cell or within neighboring small cells, the reuse may be done by applying different cyclic shifts from different cells and the cells can all transmit with the same scrambling sequence as shown in subframe 902 in FIG. 9B. If the cells are tightly time synchronized, several or all the cells may transmit with one common cyclic shift on some REs so that their transmissions can be aggregated by the UE to better track the time. Note that on other REs and/or on all REs the cells may transmit their RS with their allocated cyclic shifts.

If the timing error between the carrier and the UE is not significant (e.g., within the cyclic prefix length), then the eRS may not need to carry any signal for synchronization, such as PSS or CRS to help the UE determine the FFT window; instead, it may be DMRS (or the like) which can be used by the UE for demodulation with suitable digital processing, or CSI-RS (or the like) which can be used for CSI feedback. A carrier with periodic PSS/CRS/DRS transmissions falls into this category, if the CRS/DRS periodicity is not too long. However, if the timing error between the carrier and the UE is larger than the CP length, a signal that can help the UE to determine the FFT window and achieve fine synchronization needs to be included in the eRS. The signal can be a PSS-like signal, or a CRS-like signal. In one embodiment, the signal can be a DRS, concentrated on the first few symbols of a subframe. In one embodiment, one or more PSS-like sequences can be present in the eRS symbol, or spread in more than one eRS symbol in one subframe, or spread in more than one eRS subframes (e.g., one PSS on the first symbol in one subframe for one group of UEs to achieve synchronization). A carrier without PSS/CRS/DRS transmissions for a long time falls into this category. For example, an unlicensed carrier without periodic DRS configured. For another example, an opportunistic licensed carrier without periodic DRS configured.

Figure 9C:
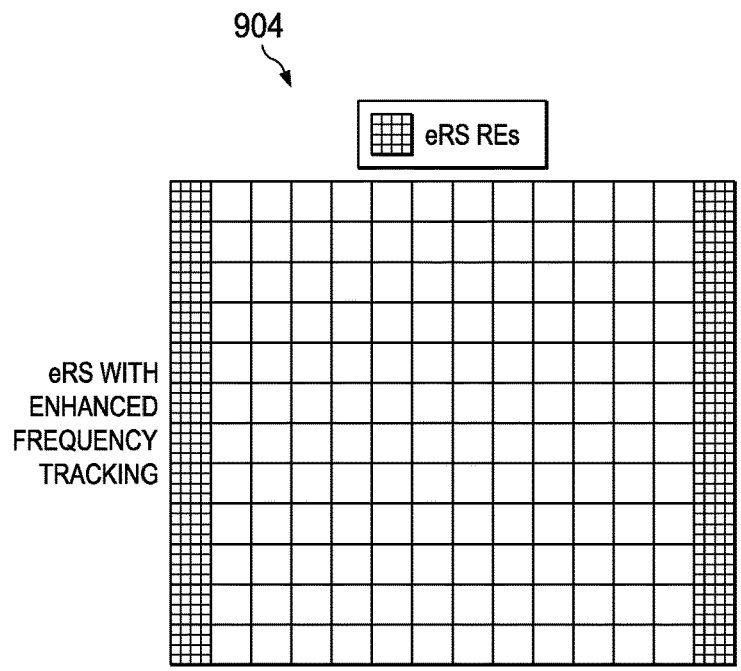
Figure 9D:
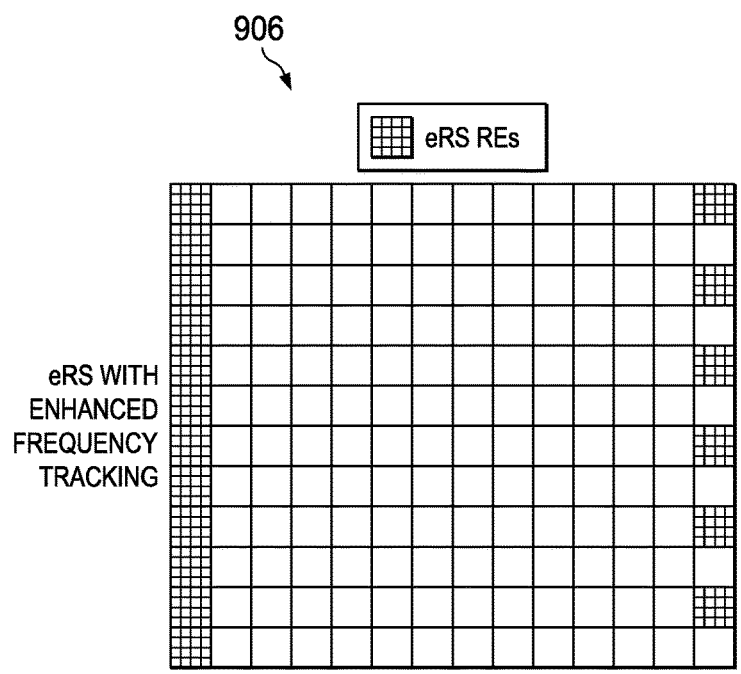
Figure 9E:
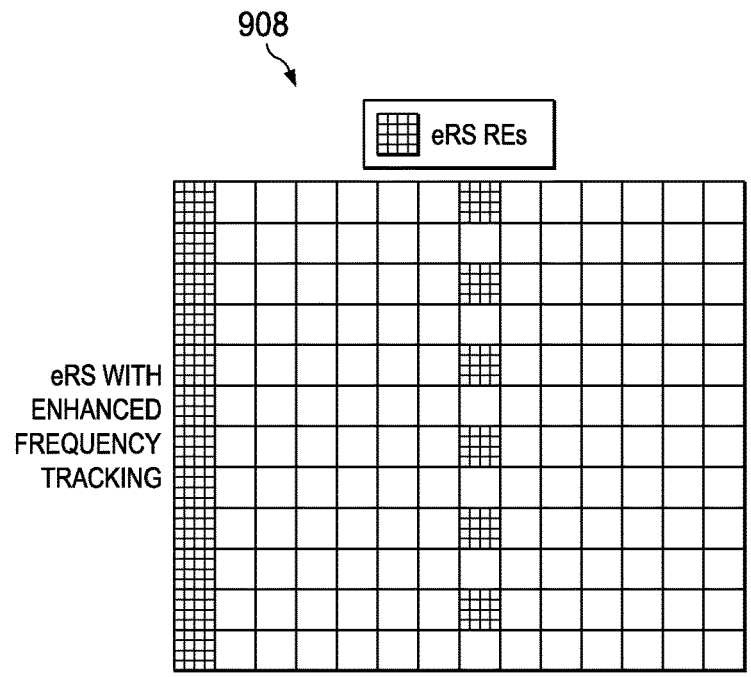
Figure 9F:
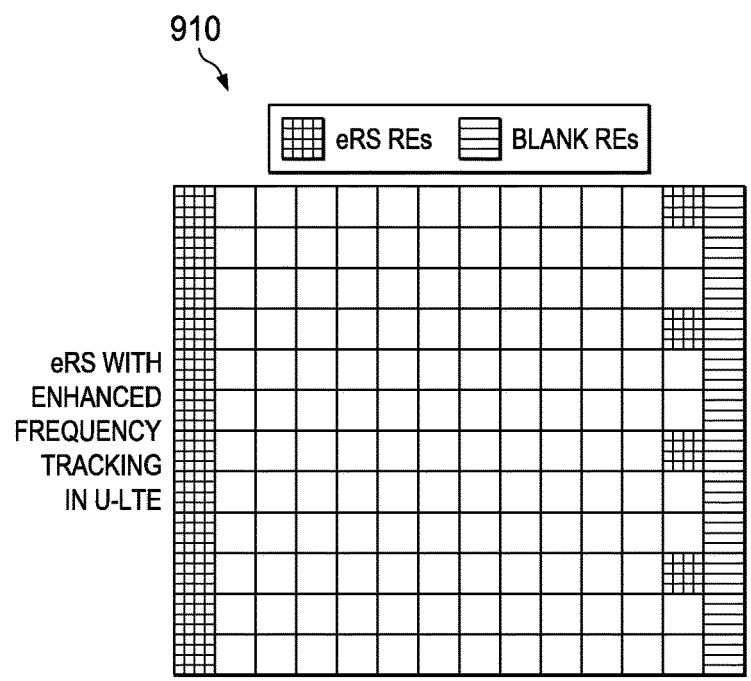

An embodiment to help the UE perform frequency tracking is to transmit enhanced RS in two OFDM symbols in a subframe. The farther apart the two symbols are, the better the frequency tracking performance. The first may be placed in the first symbol of the subframe. The second may be placed in the last useable symbol of the subframe. In case of licensed carrier it may be in the last of the subframe 904 as shown in FIG. 9C. But in case of unlicensed where the network/UE need to perform listening, the last symbol of the subframe may be used for listening, and the RS may be placed right before it as shown in subframe 910 in FIG. 9F. By keeping the RS-bearing symbols far apart can yield good frequency tracking performance. However, if the frequency tracking accuracy can be satisfied with two RS-bearing symbols closer to each other, the second may be placed closer to the first so that the tracking can be sooner. For example, the second may be placed in the first OFDM symbol of the next slot as shown in subframe 908 in FIG. 9E. Exactly where to place it can be derived by calculating the drifting rate based on requirements and off duration. The second symbol for eRS may not be solely occupied by eRS REs; some REs may be used for data transmission or other purposes; as shown by subframes 904 and 906 in FIGS. 9C and 9D respectively. These embodiments may be combined.

With the enhanced RS, a subframe may become self-contained. In other words, the subframe may not need to rely on RS on other RS (e.g., CRS) in a different subframe for tracking and AGC adjustment and possibly demodulation. DRS may still be used once in a while, either periodic with low duty cycle, or aperiodic based on network triggering, and the DRS may provide coarse time/frequency tracking, RRM measurements, and AGC. Quasi-co-location relation between the DRS ports and the enhanced RS ports may be specified so that the UE can utilize tracking/measurement/AGC previously attained using DRS (or enhanced RS) for the enhanced RS (or DRS). The enhanced RS may also be placed in consecutive subframes, such as relying on the first OFDM symbols of the first and second subframes to complete the frequency tracking, but then the first subframe may not be fully self-contained.

Figure 9G:
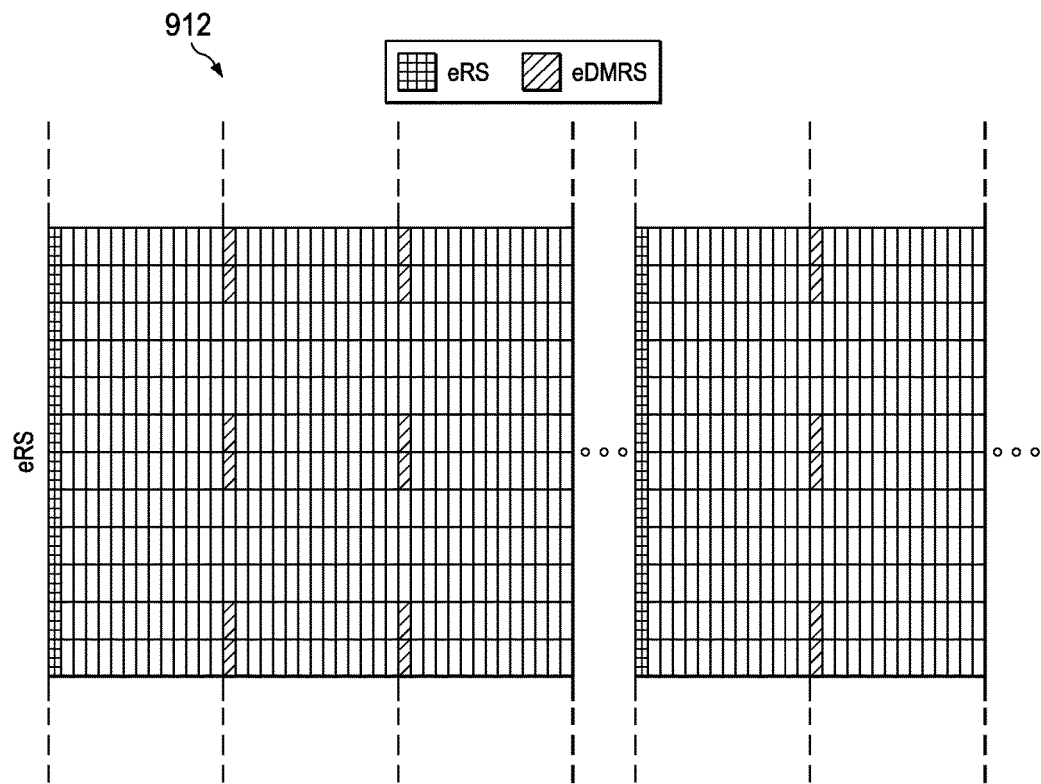

Such a self-contained subframe may not be needed for every data subframe. Especially such a subframe may have higher overhead. In addition, after the UE acquires tracking and AGC from a self-contained subframe, the UE can maintain tracking/AGC for at least several subframe durations and only DMRS may be needed for demodulation. Therefore, there may be more than one type of subframes, self-contained subframe and dependent subframe. The dependent subframe cannot standalone and it has to derive channel properties based on RS in another subframe using network-specified quasi-co-location relationship. The UE may assume every time the carrier is turning on, the first subframe is a self-contained subframe, and all later subframes are dependent subframe. However the later subframe may also be a self-contained subframe in order to maintain tracking performance. Then the occurrence of the self-contained subframes may be signaled as periodic (pre-configured, such as once every 5 or 10 ms) or aperiodic (by physical layer or MAC layer signaling). The occurrence of the self-contained subframes may also be left for UE autonomous detection as shown by subframe 912 in FIG. 9G where the eRS for tracking is transmitted only once in a few subframes while the data subframes (dependent subframes) may not contain eRS. However, the eRS transmissions in later occurrences may not need to have frequency-domain density as high as the first occurrences, since the later occurrences is used only for very fine adjustments due to slow drifts.

The enhanced RS may also use some of its time/frequency/cyclic shift resources for MIMO support. For example, the cyclic shifts may be used to indicate channel conditions associated with different antenna ports from one cell. Therefore, on one RE a cell may transmit on more than one cyclic shift. The total transmission power may be split equally across the ports.

CSI measurements may be based on the enhanced RS upon receipt of the RS. The one-symbol enhanced RS may be sufficient for reasonable CSI measurement and the UE may report the measurement as soon as it can. If one-symbol enhanced RS is not sufficient, another symbol of enhanced RS may be added and it may be next to the first symbol, in order to shorten the latency.

Figure 9H:
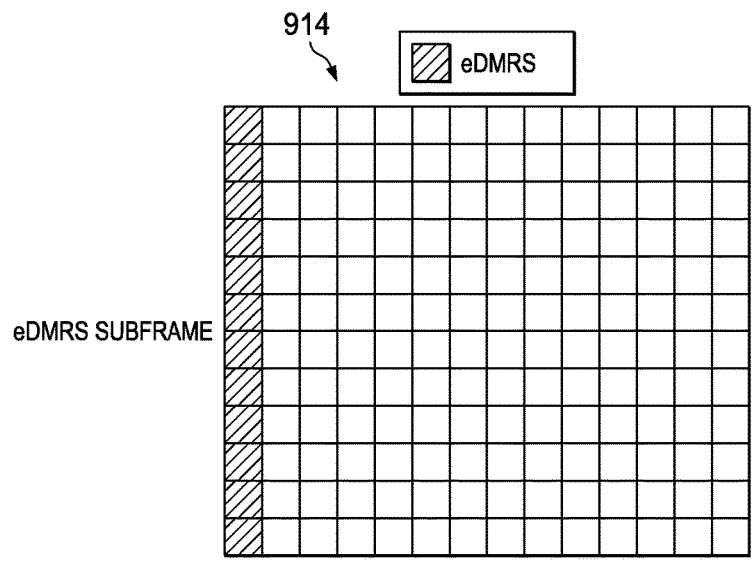
Figure 9I:
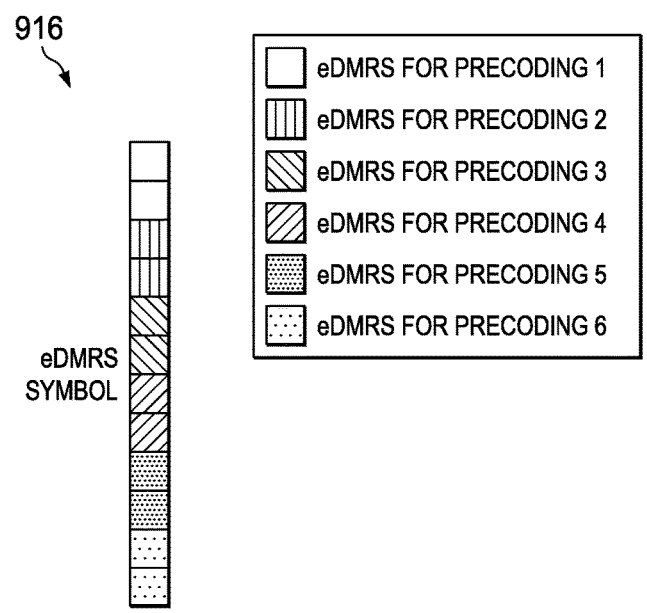

The scrambling sequence for the enhanced RS may be DMRS sequences, and such DMRS may be called eDMRS as shown by subframe 914 in FIG. 9H. eRS may or may not be using DMRS sequences, and therefore, may or may not be part of the eDMRS. Precoding may be performed on part or all of the eDMRS as shown by subframe 916 in FIG. 9I. RS indicating higher ranks can also be designed. Such enhanced DMRS may contain several sections, where some may be used for tracking/AGC only and some others may be used for demodulation of PDSCH. For example, one some REs of the first OFDM symbol eRS may be present, while on other REs of the first OFDM symbol eDMRS may be present. Those eRS REs may be located in the center 6 RBs or on specific RBs. The eDMRS may be designed as UE specific or cell specific, in the latter case the network may signal the UE which DMRS it may use for demodulation. In some sense the DL RS design may resemble UL RS design. For example, in FIG. 9I, a number of precodings are applied to some eDMRS REs, and for the PDSCH in this subframe or next subframe(s), each PDSCH may be associated with a precoding index, and the UE can use the associated eDMRS for demodulation. The precodings may be common in all subframes, which may have a limited number of predefined precoding vectors/matrices to cover certain beamforming directions (e.g., 12 precoding vectors/matrices in total to cover all possible directions). Therefore, the eDMRS may be indexed according to their precoding vectors/matrices and ranks, and the PDSCH scheduled by (E)PDCCH will be indicated with the eDMRS index which the UE will use for demodulation. The CSI measurements and feedback may also be based on these eDMRS and the UE reports the eDMRS index expected to maximize the data rate; that is, the UE does not need to estimate the data rates by hypothesizing precodings and ranks based on non-precoded RS, instead, it estimate the data rates by measuring a number of precoded RS. Alternatively, the precoding vectors/matrices may not be predefined and the UE may not assume from one subframe to another, the eDMRS remain unchanged.

The embodiments may be applied in various scenarios. In the case of subframe-level small cell on/off, if DRS is not configured or DRS periodicity is long, then eRS can be used for time synchronization, channel estimation, measurements, CSI feedback, and so on. At the first subframe when the cell is turning on, eRS can help UE acquire timing/AGC/ etc. as soon as it can. Effectively eRS in this case can serve the role of a DRS but with flexibility (e.g., transmitted aperiodically). Then eDMRS can be used for demodulation/ CSI feedback/etc. If DRS is configured with sufficiently short periodicity and timing is not an issue, then eDMRS can be configured. In the case of LTE operating on unlicensed band, generally there cannot be any periodic DRS, and the eRS can be sent aperiodically on-demand, which may contain PSS-like signals for timing and additional RS for channel estimation, measurements, CSI feedback, etc. The eRS may also contain eDMRS which may be used to replace legacy DMRS. In addition, in the case of LTE operating on high-frequency band, the eRS may contain PSS-like signals for timing synchronization, cell-specific/UE-specific eDMRS for precoding and receiving combining training and feedback, and cell-specific/UE-specific eDMRS for data demodulation.

Furthermore, an embodiment design of RS, called variable-duration RS (VDRS), can be introduced to the above-mentioned eRS embodiments, frame structure embodiments, and measurements/procedure embodiments. The embodiment design of VDRS can be applied in various scenarios, including but not limited to, dynamic on/off of a component carrier, dynamic carrier selection, U-LTE operations, and mmWave operations. Generally speaking, a VDRS is a RS that can be transmitted or received with duration not necessarily as a multiple of an OFDM symbol duration, but the receiver can still detect the RS. Details will be provided below.

In U-LTE, the control/data transmission may start from the 1$^{st}$ OFDM symbol of a subframe. However, in order to transmit on the subframe, carrier sensing may need to be performed before the subframe starts, i.e., the eNB needs to determine if the channel can be used or not before the subframe starts (subject to regulatory CCA and backoff requirements). However, when the eNB determines that the channel is available, it has to reserve the channel immediately by transmitting certain signals to occupy the channel; otherwise, other nodes (e.g. a WiFi AP) may start transmitting before the U-LTE subframe starts. In an embodiment, the eNB may transmit a RS immediately after it determines the channel as available. However, as generally the control/ data transmission has to be deferred to the 1$^{st}$ symbol of the next subframe, the duration of the RS cannot be pre-determined and becomes not fixed since the starting time of the RS can vary per sensing results. In other words, a variable-length RS may be needed.

Figure 10:
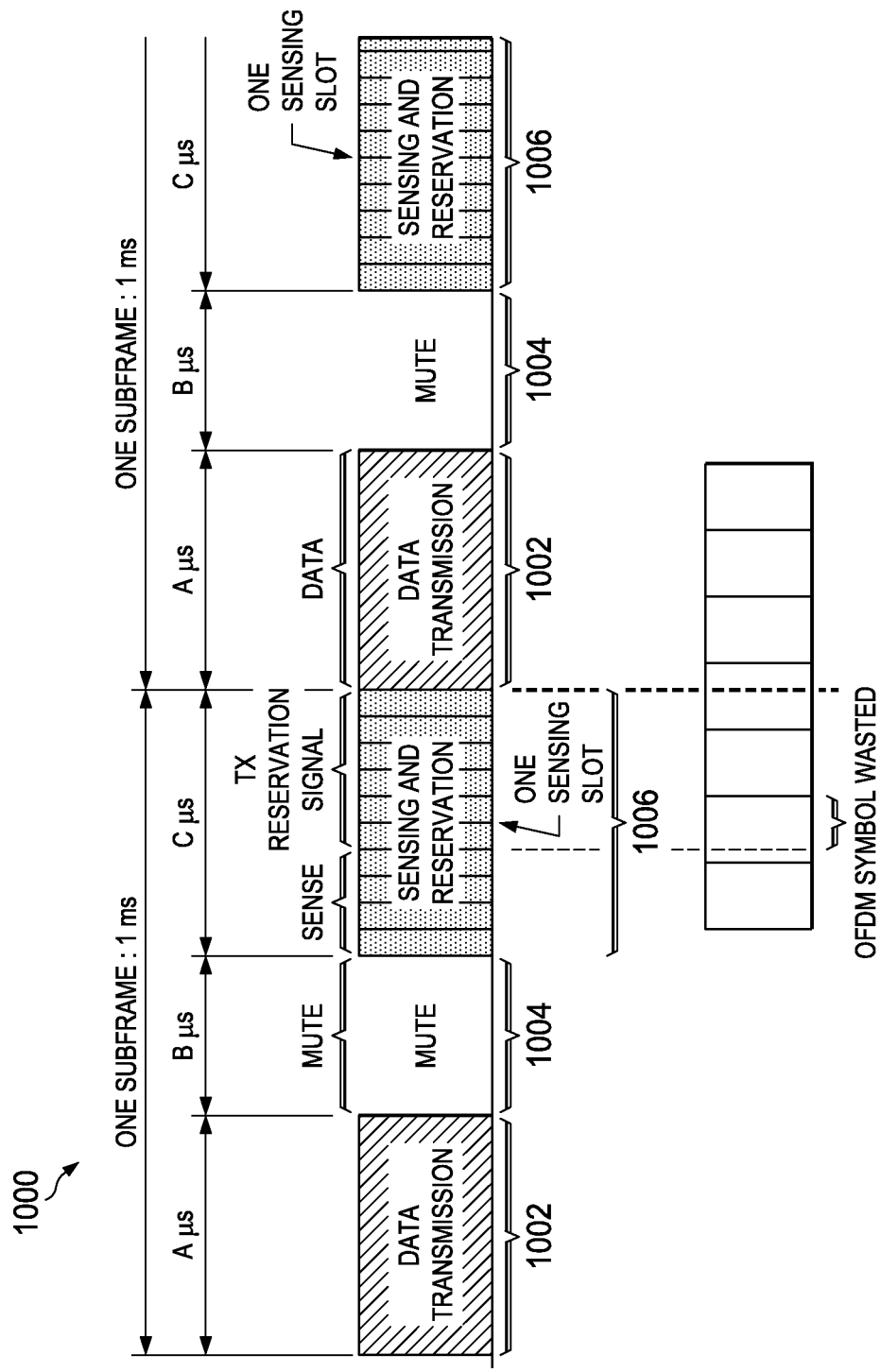
FIG. 10 is a diagram illustrating problems with prior art reference signal methods.

FIG. 10 is a diagram of a system 1000 of frames illustrating problems with prior art reference signal methods. System 1000 includes two frames each with a data transmission period 1002, a mute period 1004, and a sensing and reservation period 1006. The data transmission period 1002 may occupy a time "A" microseconds. The mute period 1004 may occupy one subframe of 1 millisecond. The sending and reservation period 1006 may include tens of slots with some of the slots dedicated to sensing and some for the tx reservation signal. The transmission of the reservation signal may start at "any" time. However, the UE timing for OFDM symbols may not align with the sensing slot or the eNB timing since the transmission may not start at exactly the beginning of the OFDM symbol.

However, the disclosed variable duration reference signal (VDRS) overcomes these problems.

Figure 11:
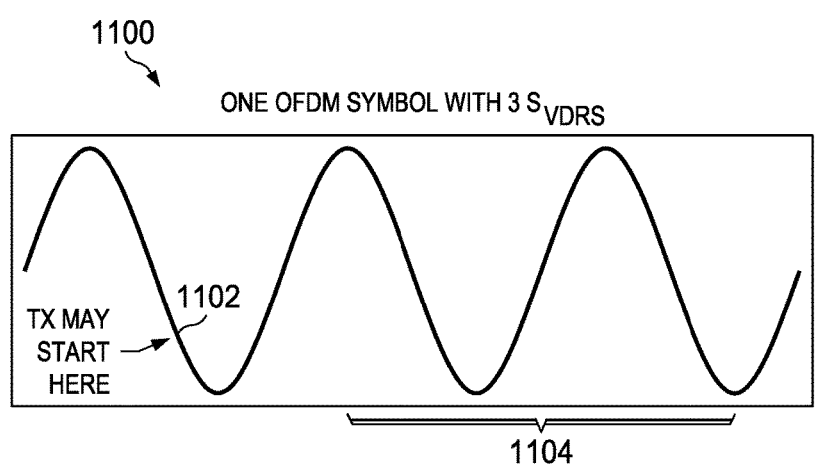
FIG. 11 is a diagram of an embodiment of a variable-duration RS (VDRS) with one OFDM symbol with three $S_{VDRS}$.

FIG. 11 is a diagram illustrating an embodiment of a VDRS 1100. The VDRS 1100 may include one OFDM symbol with three replicas of one base signal ($S_{VDRS}$). A truncated or full symbol of the VDRS can be transmitted. For example, the transmission may not start until time 1102 which is not at the beginning of the OFDM. The UE capturing a portion of the VDRS can detect it as long as the portion 1104 contains at least one complete replica of the base signal. Multiple antenna ports are multiplexed through orthogonal cyclic shifts or FDM. The VDRS may serve as a reservation signal for an eNB. The UE can also use the VDRS to perform antenna port channel estimation, perform frequency estimation based on multiple $S_{VDRS}$, and perform FFT timing window adjustment estimation.

Figure 12A:
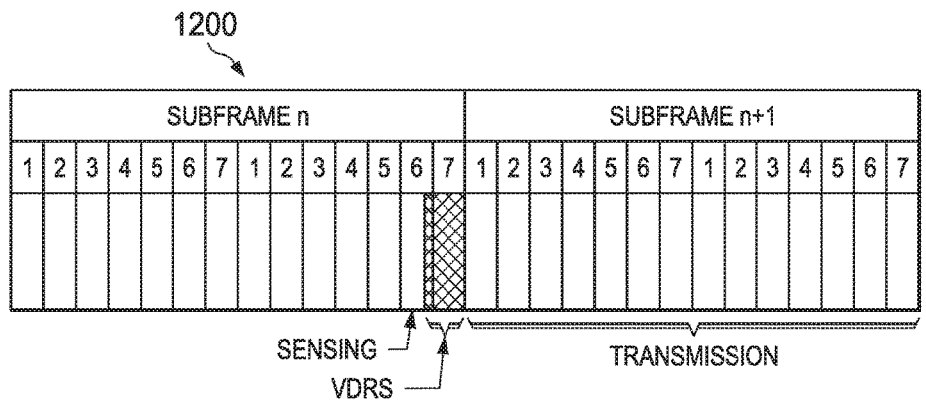
FIGS. 12A-12H illustrate embodiments of variable-duration RS (VDRS)

In FIG. 12A, the embodiment of a frame 1200 for VDRS for U-LTE is illustrated. Based on the sensing result, the node determines that it can start occupying the channel before the ending of the 6$^{th}$ OFDM symbol of the second slot of subframe n. Without waiting until the start of the 7$^{th}$ symbol, the node can start transmitting VDRS. Other nodes (e.g. WiFi nodes) sensing the channel will then not transmit. The node can then transmit the VDRS till the start of the next subframe. The receiving node, such as a UE, is required to monitor the potential VDRS transmission since a configured VDRS starting time window. The UE may not be able to precisely capture the VDRS from the beginning of the VDRS, i.e., it may miss some portion of the VDRS. However, the UE may still be able to detect the VDRS based on only an incomplete portion of the VDRS. This special property of the VDRS comes from the special design of the VDRS, which will be described with details later.

Figure 12B:
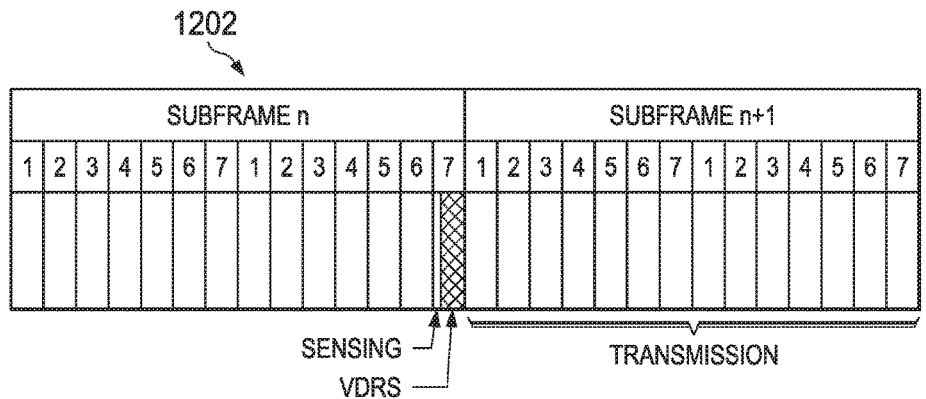

An embodiment of a frame 1202 for VDRS is provided in FIG. 12B, which shows that the VDRS can be shorter than one OFDM symbol duration. If the VDRS periodicity factor is M, then as long as the UE can capture VDRS with duration no shorter than 1/M of the OFDM symbol duration, and the UE's timing error with respect to the node is no larger than +/−1/(2M) of the OFDM symbol duration, the UE can detect the VDRS and obtain timing from the node.

Figure 12C:
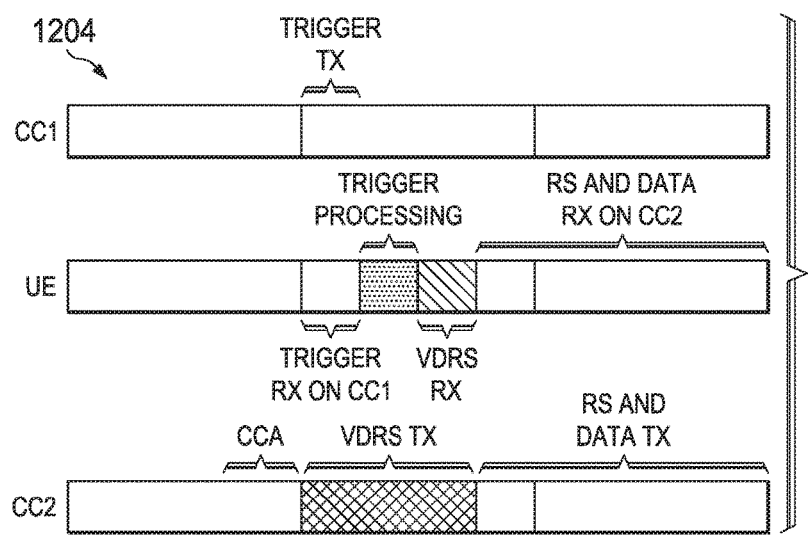

The VDRS can be applied to the embodiments described before for U-LTE. For example, in FIG. 12C, an embodiment system 1204 shows that VDRS can be used with the triggering mechanism (not drawn to scale). The CC1 may transmit the trigger in, e.g., the 1$^{st}$ OFDM symbol, and the UE may receive the trigger and process the received signal for some time, e.g., about half of the symbol duration. CC2 may transmit the VDRS from the 1st symbol and then RS/data from the 4$^{th}$ symbol. In this case, the UE can start acquiring the VDRS from about the 1.5 symbol until the end of the 3$^{rd}$ symbol. Note that a different UE may have different capability of finishing processing the trigger, so a different UE may start acquiring the VDRS from a different time instant, but as long as it can obtain sufficiently long VDRS, it can detect the VDRS.

Figure 12D:
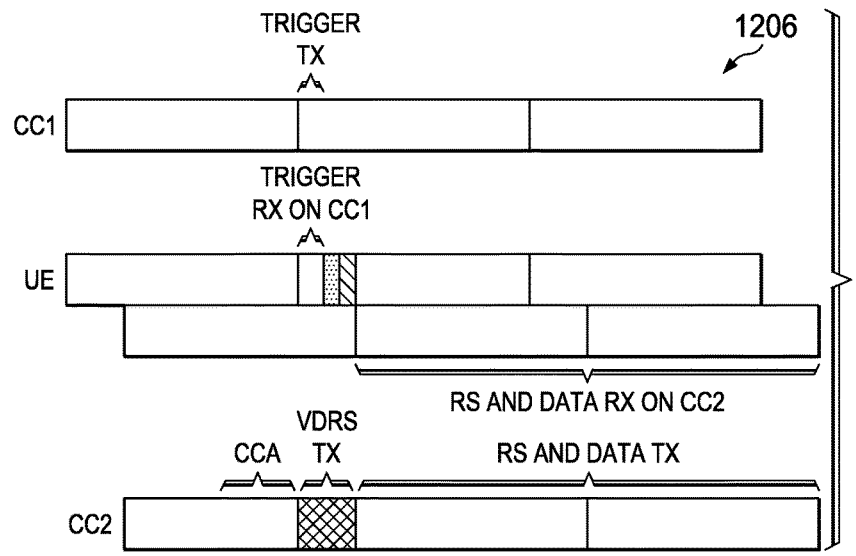

FIG. 12D shows an embodiment system 1206 of VDRS applying to the case with trigger and subframe boundary offset.

The VDRS in the U-LTE case can be useful not only to reserve the channel when the channel is available for use, but also useful for the UE to acquire time/frequency synchronization, perform channel estimation, perform RRM/ CSI measurements, etc. The VDRS can be combined with the eRS designs.

The VDRS is also useful in the dynamic on/off case with licensed carriers, even though there is no need for an opportunistic carrier to reserve the channel. In an embodiment, the opportunistic carrier relies on cross-carrier scheduling. In this scenario, the subframe boundary of the opportunistic carrier may be shifted or non-shifted. In any event, the VDRS can be transmitted similar to the case of U-LTE. The reasons can include the possible timing error between the opportunistic carrier and the UE or the scheduling carrier, the uncertain duration of the UE to decode the scheduling signaling, the uncertain duration of the UE to acquire the newly turned on opportunistic carrier (for AGC settling, for RF retuning, tracking, etc.), and so on. On the other hand, if the opportunistic carrier relies on self scheduling, then the VDRS can also be transmitted prior to the data subframe or embedded in the data subframe, so that the UE can detect on/off based on the VDRS, obtain timing/frequency tracking, etc. Note that frequency tracking may be based on one transmission of VDRS, but to be more accurate, more than one transmission of the VDRS can be used.

Figure 12E:
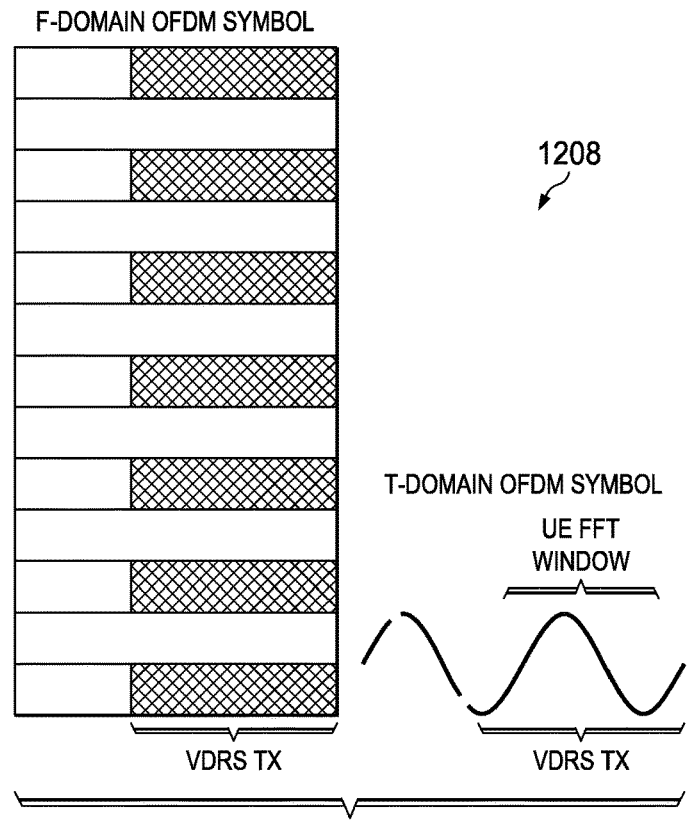

FIG. 12E illustrates an embodiment of the frequency-domain transmission 1208 of VDRS and time-domain transmission of VDRS. In this example, the VDRS periodicity factor is 2. In frequency-domain, the VDRS appears in every other RE, and power boost of 3 dB can be applied to compensate the blanked REs. In time-domain, the VDRS occupies only a portion of the OFDM symbol (shown as the solid part of the waveform). If the VDRS spans the entire OFDM symbol, the second half of the signal waveform would be an exact repetition of the first half. In general, the UE cannot capture the exact starting or ending of the waveform, but it has the flexibility to place its FFT window so that one (out of two) complete waveform is included. Thus the UE can still detect the partially received VDRS. Note that the VDRS transmission may or may not span the entire symbol duration. A CP is not needed for VDRS.

If the periodicity factor is M, then the VDRS is transmitted one out every M REs in frequency-domain, and repeats itself M time in time-domain. This may be effectively viewed as a subcarrier spacing M times the normal one (in either case, the DC is at the same location and is removed for transmission). If the UE can capture a portion of the signal containing at least one complete waveform, and the UE can resolve the timing ambiguity by either coarse synchronization obtained before or by hypothesizing, then the UE can detect VDRS and acquire fine synchronization. M can also be 1. Note that M may even be a fraction number; in this case, several OFDM symbols are connected as one extended symbol for VDRS transmission. However, the node and the UE should have common understanding of the resources and signal form of the VDRS (e.g., by standardization and/or RRC/PHY configuration).

The VDRS can be combined with one or more embodiments of the eRS/eDMRS design.

The VDRS is also useful in mmWave communications. As an example, the mmWave OFDM symbol duration may be short (shorter than 1 ms as in current LTE, say, 10 us), and hence its CP is also short (say, 1 us). This may make the UE reception more vulnerable to the timing error between the UE and the mmWave cell. For example, the UE is synchronized to its PCell, and the Pcell and a Scell is synchronized with timing error no larger than a few microseconds, say +/−3 us. This is sufficient for microwave communication. But if the Scell is a mmWave cell operating with shorter CP length, the +/−3 us timing error may be well beyond the CP length. In this case, the VDRS can be transmitted. If the VDRS periodicity factor is 2, then the UE can receive as long as the timing error is no larger than 5 us in the above example.

The design of the VDRS is described as follows.

In an embodiment, the VDRS is a signal of variable duration and is generated by the cyclic extension of a base signal, and the phase of the VDRS at each time instance relative to the starting and ending timing of a symbol is deterministic. The phase is a deterministic function in time within each symbol, as p(t), where t is between 0 (corresponding to symbol beginning time) and T (corresponding to symbol ending time), p(t) is deterministic in t and the function is known to both the transmitter and receiver. The formulas provided below are examples of such. Thus, embodiments of the base-band VDRS, called $S_{VDRS}$, are:

$$s(t) = \sum_{p=0}^{P-1} \left[ \sum_{k=-\lfloor N_{RB}^{DL} N_{sc}^{RB}/(2M) \rfloor}^{-1} \sqrt{M/P} \cdot a_{k(-)} \cdot e^{j2\pi M(1+C_p)k\Delta f(t-T)} + \sum_{k=1}^{\lfloor N_{RB}^{DL} N_{sc}^{RB}/(2M) \rfloor} \sqrt{M/P} \cdot a_{k(+)} \cdot e^{j2\pi M(1+C_p)k\Delta f(t-T)} \right]$$

if the antenna ports are cyclic shift multiplexed, and $$s(t) = \sum_{p=0}^{P-1} \left[ \sum_{k=-\lfloor N_{RB}^{DL} N_{sc}^{RB}/(2MP) \rfloor}^{-1} \sqrt{M} \cdot a_{k(-)} \cdot e^{j2\pi(PMk-pM)\Delta f(t-T)} + \sum_{k=1}^{\lfloor N_{RB}^{DL} N_{sc}^{RB}/(2MP) \rfloor} \sqrt{M} \cdot a_{k(+)} \cdot e^{j2\pi M(PMk-pM)\Delta f(t-T)} \right]$$

if the antenna ports are frequency division multiplexed (FDM).

In this equation, P denotes the total number of configured antenna ports, T denotes the transmission duration of VDRS, M denotes the periodicity factor, $C_p$ denotes the antenna-port specific design parameter controlling the amount of cyclic shift, and $a_k$ denotes cell specific scrambling sequence. The time-continuous signal $s_l^{(p)}(t)$ on antenna port p in OFDM symbol l in a downlink slot is defined by $$s_l^{(p)}(t) = \sum_{k=-\lfloor N_{RB}^{DL} N_{sc}^{RB}/2 \rfloor}^{-1} a_{k(-),l}^{(p)} \cdot e^{j2\pi k\Delta f(t-N_{CP,l}T_s)} + \sum_{k=1}^{\lfloor N_{RB}^{DL} N_{sc}^{RB}/2 \rfloor} a_{k(+),l}^{(p)} \cdot e^{j2\pi k\Delta f(t-N_{CP,l}T_s)}$$

for $0 \le t < (N_{CP,l}+N) \times T_s$ where $k^{(-)}=k+\lfloor N_{RB}^{DL} N_{sc}^{RB}/2 \rfloor$ and $k^{(+)}=k+\lfloor N_{RB}^{DL} N_{sc}^{RB}/2 \rfloor -1$. The variable N equals 2048 for $\Delta f=15$ kHz subcarrier spacing and 4096 for $\Delta f=7.5$ kHz subcarrier spacing. Additional information concerning the time-continuous signal may be found in 3GPP TS 36.211 V12.6.0 (2015-06), Technical Specification, which is incorporated herein by reference.

The VDRS consists one or many replica of one basic signal $S_{VDRS}$ which has duration of 1/M OFDM symbol length. By properly choosing M at the node, it can ensure that the UE receiving VDRS can obtain at least one complete copy of $S_{VDRS}$. FFT operation on $S_{VDRS}$ results in orthogonal subcarriers facilitating antenna port channel estimation, frequency estimation based on one or multiple $S_{VDRS}$, FFT timing window adjustment estimation, etc. The continuous waveform design relaxes the network maximum timing uncertainty requirements.

Furthermore, multiple antenna ports are multiplexed through orthogonal cyclic shifts or FDM. For VDRS contains multiple $S_{VDRS}$, the estimations based on individual $S_{VDRS}$ could be easily combined for improved performance.

Other embodiment designs can also be obtained by properly modifying/refining the baseband signal generation equation. For example, T can be set as the OFDM symbol duration or a multiple of it, a different parameter or scrambling sequence can be used for different OFDM symbols (such as for different antenna port, different M, etc.).

Figure 12F:
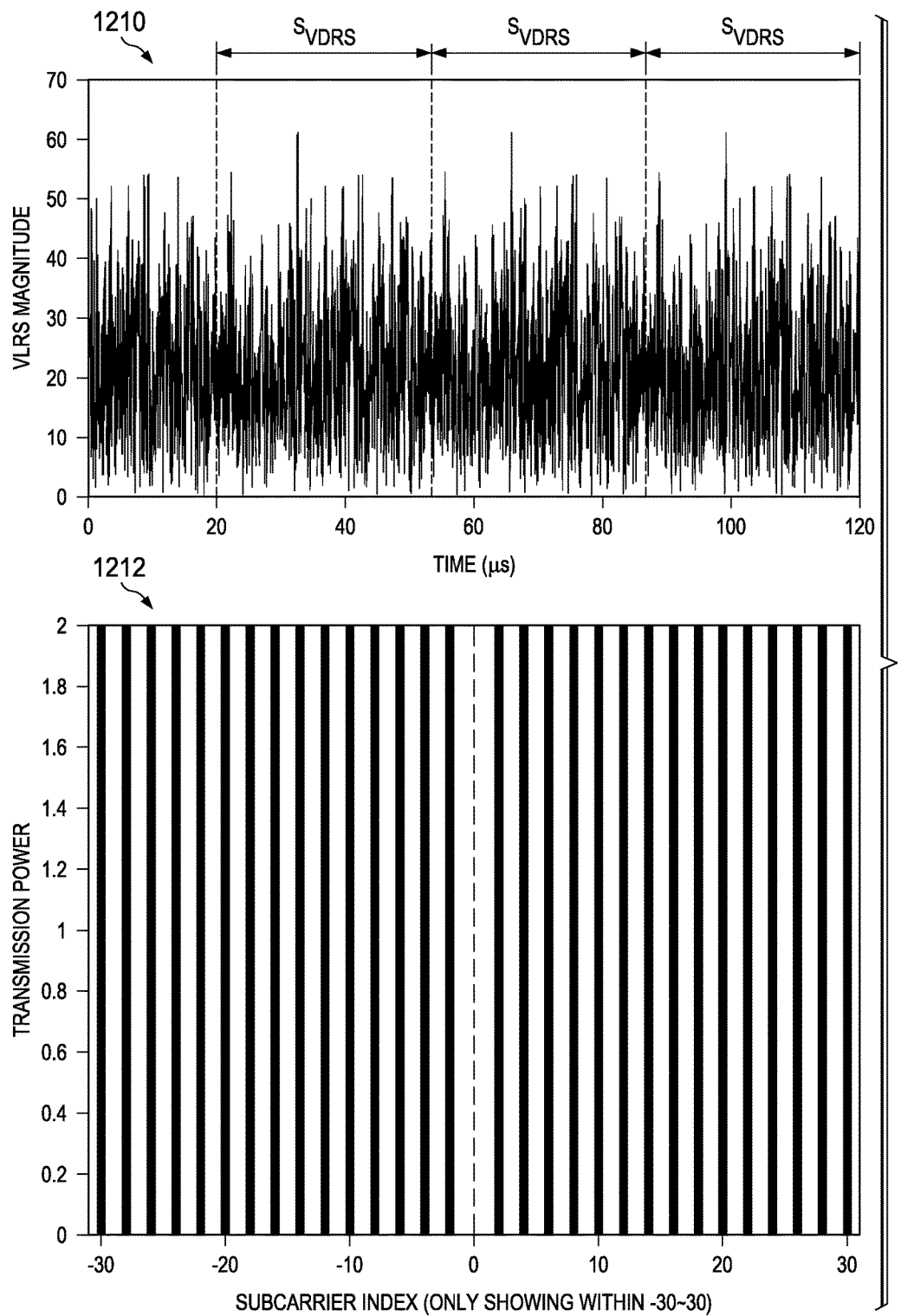

FIG. 12F shows an example of 10 MHz, T=120 us, M=2 and P=1, in time-domain 1210 and frequency-domain 1212, respectively. In time domain, the signals are repeated, but not necessarily with a whole number of repetitions. In frequency domain, it can be seen the power is distributed in every other RE.

Figure 12G:
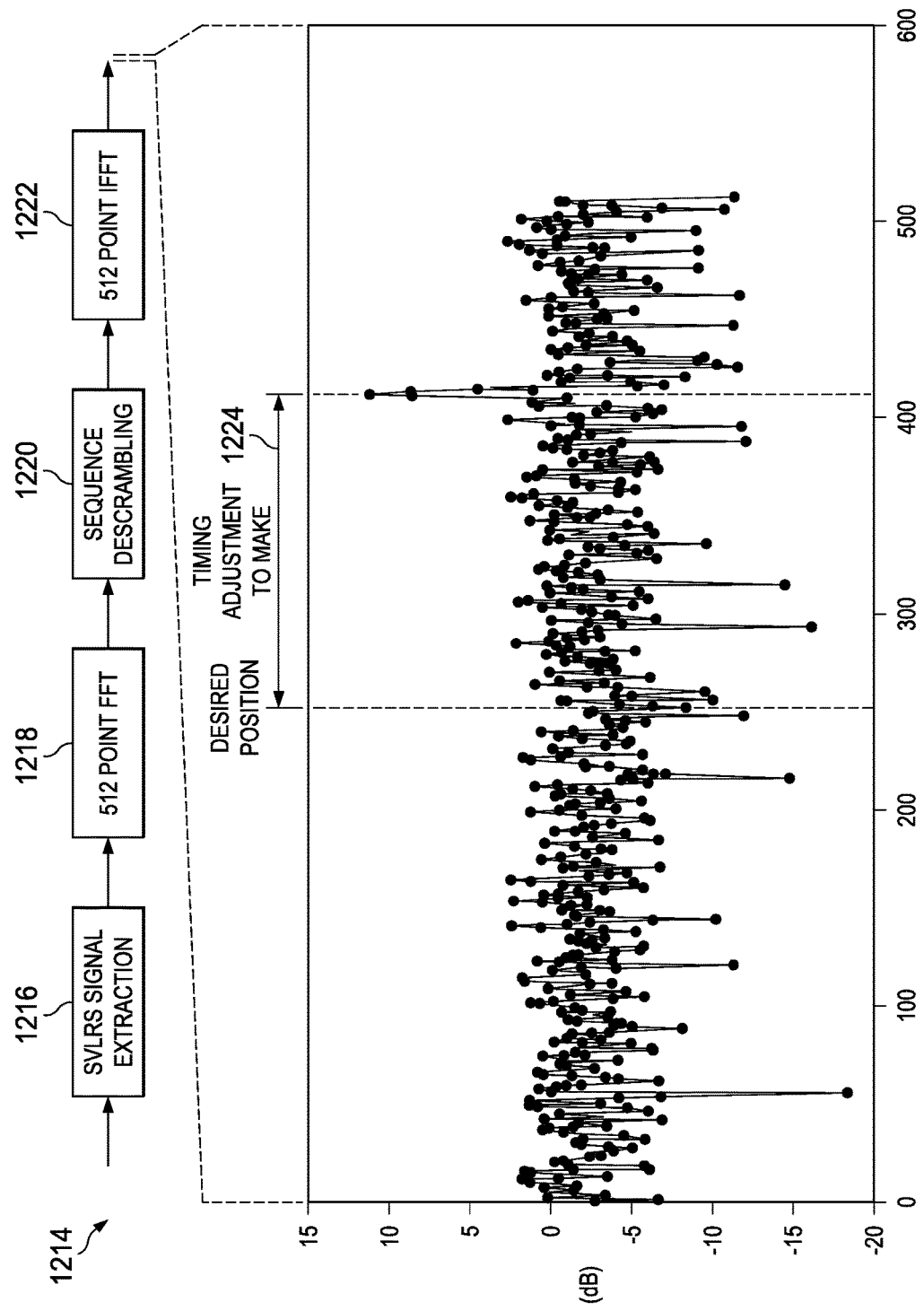

FIG. 12G shows an embodiment of UE VDRS processing 1214 for 10 MHz, M=2, P=1 and one path channel, UE FFT size=1024/M=512 and capture time interval=1/15K/2 s, SNR=0 dB. The procedure 1214 begins with SVLRS signal extraction 1216 after which, 512 point FFT 1218 is performed. Next, sequence descrambling 1220 is performed followed by 512 point IFFT 1222. As can be seen from FIG. 12G, the peak 1224 of the signal is not at the center, so the UE understands that timing adjustment is needed so that the peak will occur at the center. By doing so the UE acquires the timing of the node.

Figure 12H:
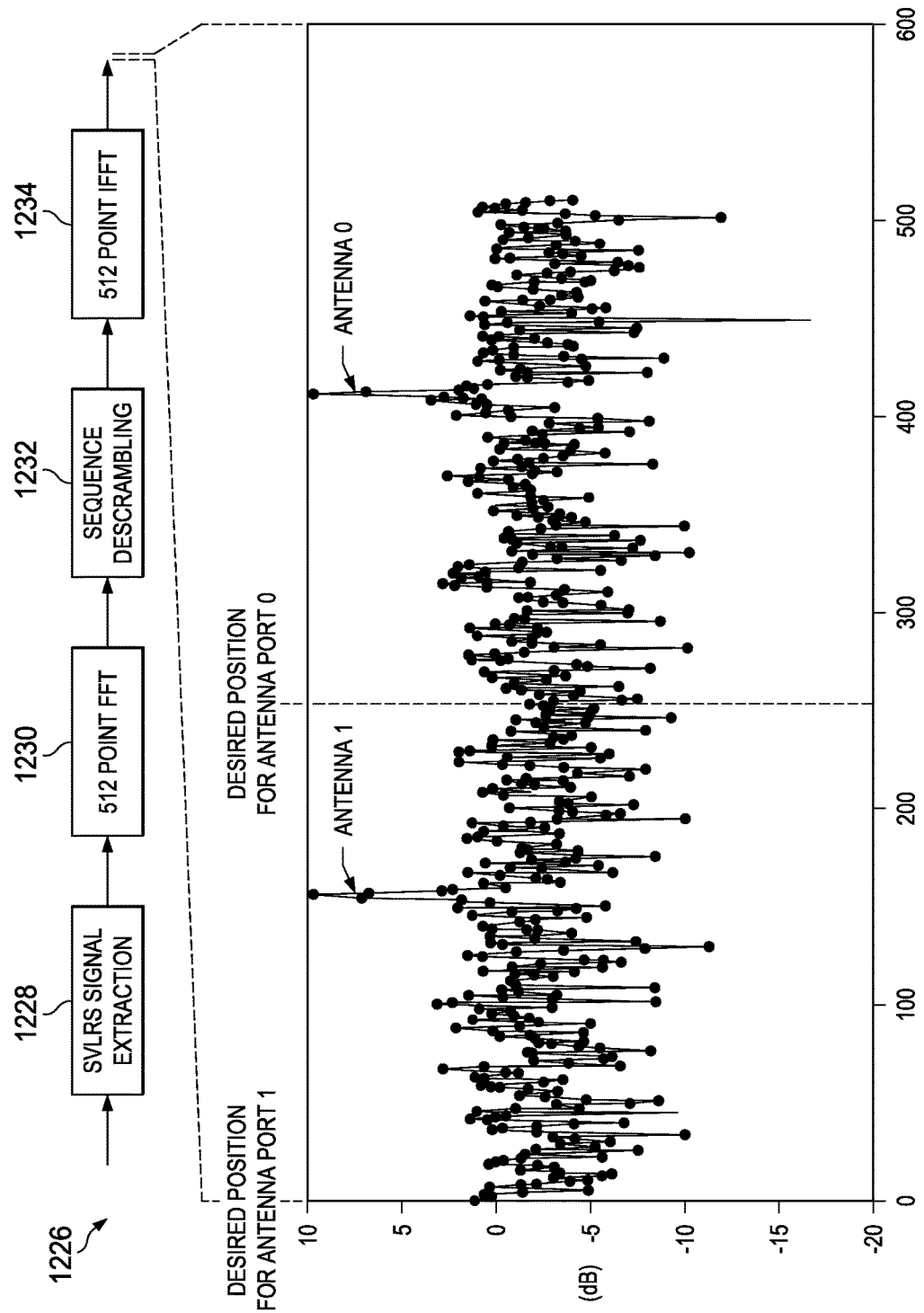

FIG. 12H shows an embodiment of UE VDRS processing 1226 for 10 MHz, M=2, P=2 with cyclic shift multiplexing and one path channel, UE FFT size=1024/M=512 and capture time interval=1/15K/2 s, SNR=0 dB. The process 1226 begins with SVLRS signal extraction 1228 followed by 512 point FFT 1230. Next, sequence descrambling 1232 is performed. Next, 512 point IFFt 1234 is performed. The UE will also adjust its timing to match the node's, but if an ambiguity occurs, sequence correlation and hypothesis testing can be used to resolve the ambiguity.

The VDRS is not limited to node to UE transmissions. It may also be used for UE to node (UL) transmissions, backhaul over-the-air communications, etc.

Figure 13:
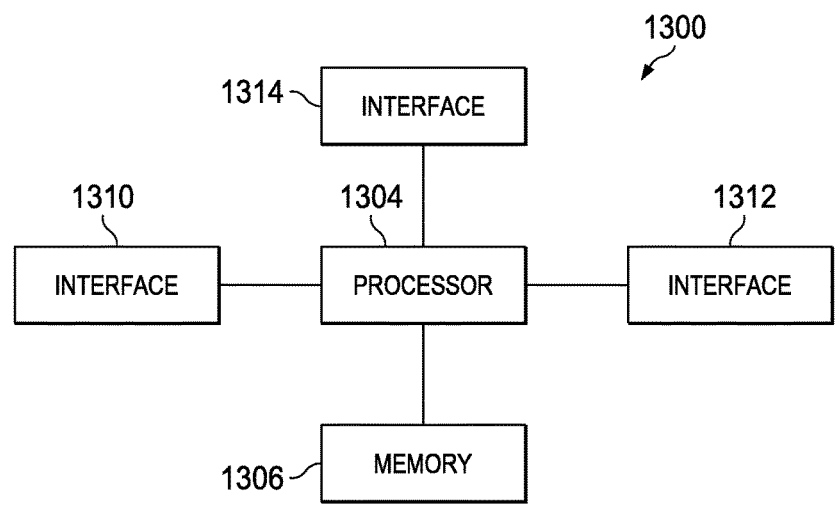
FIG. 13 illustrates a block diagram of an embodiment processing system for performing methods described herein, which may be installed in a host device.

FIG. 13 illustrates a block diagram of an embodiment processing system 1300 for performing methods described herein, which may be installed in a host device. As shown, the processing system 1300 includes a processor 1304, a memory 1306, and interfaces 1310-1314, which may (or may not) be arranged as shown in FIG. 13. The processor 1304 may be any component or collection of components adapted to perform computations and/or other processing related tasks, and the memory 1306 may be any component or collection of components adapted to store programming and/or instructions for execution by the processor 1304. In an embodiment, the memory 1306 includes a non-transitory computer readable medium. The interfaces 1310, 1312, 1314 may be any component or collection of components that allow the processing system 1300 to communicate with other devices/components and/or a user. For example, one or more of the interfaces 1310, 1312, 1314 may be adapted to communicate data, control, or management messages from the processor 1304 to applications installed on the host device and/or a remote device. As another example, one or more of the interfaces 1310, 1312, 1314 may be adapted to allow a user or user device (e.g., personal computer (PC), etc.) to interact/communicate with the processing system 1300. The processing system 1300 may include additional components not depicted in FIG. 13, such as long term storage (e.g., non-volatile memory, etc.).

In some embodiments, the processing system 1300 is included in a network device that is accessing, or part otherwise of, a telecommunications network. In one example, the processing system 1300 is in a network-side device in a wireless or wireline telecommunications network, such as a base station, a relay station, a scheduler, a controller, a gateway, a router, an applications server, or any other device in the telecommunications network. In other embodiments, the processing system 1300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1310, 1312, 1314 connects the processing system 1300 to a transceiver adapted to transmit and receive signaling over the telecommunications network.

Figure 14:
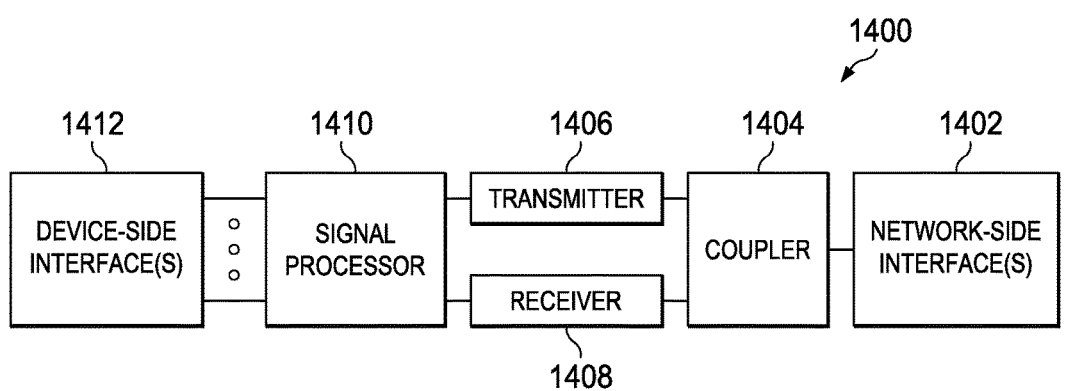
FIG. 14 illustrates a block diagram of a transceiver adapted to transmit and receive signaling over a telecommunications network.

FIG. 14 illustrates a block diagram of a transceiver 1400 adapted to transmit and receive signaling over a telecommunications network. The transceiver 1400 may be installed in a host device. As shown, the transceiver 1400 includes a network-side interface 1402, a coupler 1404, a transmitter 1406, a receiver 1408, a signal processor 1410, and a device-side interface 1412. The network-side interface 1402 may include any component or collection of components adapted to transmit or receive signaling over a wireless or wireline telecommunications network. The coupler 1404 may include any component or collection of components adapted to facilitate bi-directional communication over the network-side interface 1402. The transmitter 1406 may include any component or collection of components (e.g., up-converter, power amplifier, etc.) adapted to convert a baseband signal into a modulated carrier signal suitable for transmission over the network-side interface 1402. The receiver 1408 may include any component or collection of components (e.g., down-converter, low noise amplifier, etc.) adapted to convert a carrier signal received over the network-side interface 1402 into a baseband signal. The signal processor 1410 may include any component or collection of components adapted to convert a baseband signal into a data signal suitable for communication over the device-side interface(s) 1412, or vice-versa. The device-side interface(s) 1412 may include any component or collection of components adapted to communicate data-signals between the signal processor 1410 and components within the host device (e.g., the processing system 1300, local area network (LAN) ports, etc.).

The transceiver 1400 may transmit and receive signaling over any type of communications medium. In some embodiments, the transceiver 1400 transmits and receives signaling over a wireless medium. For example, the transceiver 1400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1402 includes one or more antenna/radiating elements. For example, the network-side interface 1402 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although primarily described in terms of a VDRS, the signal design is not limited to a specific RS (as shown in the equations above) or a specific signal. The disclosed systems and methods can be applied to any signal that can be successfully detected based on only part of the waveform in a slotted communication system (aka framed communication system, synchronous system, frame based system, such as LTE with generally deterministic OFDM symbol/slot/subframe/radio frame boundaries). For example, the waveform may carrier a message to one UE or to all UEs. The signal of variable duration may be a reservation signal to reserve the channel, but the signal can also carry data. The signal of variable duration may be used in a first symbol during discontinuous tx/rx where a UE may have lost its fine tracking and can only capture part of the symbol.

In an embodiment, method for wireless communications includes determining, by a first device, a starting timing and an ending timing of one or more symbols of a first carrier in accordance with a reference timing for transmission and reception, wherein each of the one or more symbols has a fixed duration; determining, by the first device, a signal of variable duration on the first carrier, wherein the starting timing of the signal of variable duration is offset from the starting timing of any of the one or more symbols of the first carrier in accordance with the reference timing; and transmitting, by the first device on the first carrier, the signal of variable duration, at the starting timing of the signal of variable duration. In an embodiment, the reference timing is a second timing of a second carrier of the first device. The second carrier may be the "reference" or "base" for any other carriers. So the timing of the second carrier may be a "reference timing" for itself or may be just the timing of itself. In other words, in an embodiment, whatever the second carrier does, it is considered as the reference for others. So the second carrier could be a PCell (PCC) and other carriers could be an SCell (SCC) which are described above. Also, in an embodiment, the timing includes the fine time information, e.g., symbol boundary timing, subframe boundary timing. In other words, the timing information includes when a symbol/subframe starts/finish. In an embodiment, such timing will need to be acquired by UEs via fine time synchronization using PSS/SSS/CRS. In an embodiment, the ending timing of the signal of variable duration is aligned with the ending timing of one of the one or more symbols of the first carrier. In an embodiment, the starting timing of the signal of variable duration is determined in accordance with one of a completion of a clear channel assessment (CCA) procedure on the first carrier, an availability of data or control information, and an indication of a network controlling device. In an embodiment, transmitting the signal of variable duration on the first carrier comprises transmitting the signal of variable duration to a second device on the first carrier, wherein the starting timing and ending timing of each symbol on the first carrier are acquired by the second device before the transmission of the signal of variable duration. In an embodiment, the reference timing is acquired by the second device via a timing synchronization of the second device to a second carrier of the first device. In an embodiment, the first carrier is a carrier not in a licensed band. In an embodiment, the second carrier is a carrier in a licensed band. In an embodiment, the starting timing and the ending timing of each symbol on the first carrier in accordance with the reference timing of the first device are acquired by the second device based on one of a discovery signal (DS), a reference signal (RS), a synchronization signal (PSS/SSS) on the first carrier of the first device. In an embodiment, the starting timing and ending timing of each symbol on the first carrier of the first device are aligned with those on a second carrier of the first device. In an embodiment, the transmission of the signal of variable duration on the first carrier is not signaled to the second device before the transmission of the signal of variable duration. In an embodiment, the starting timing of the signal of variable duration on the first carrier is not signaled to the second device before the transmission of the signal of variable duration. In an embodiment, the first device transmits on a second carrier to the second device a signal to start monitoring the first carrier before the transmission of the signal of variable duration. In an embodiment, the signal of variable duration is a reference signal. In an embodiment, the signal of variable duration is generated by a cyclic extension of a base signal, and a phase of the signal of variable duration at each time instance relative to the starting and ending timing of a symbol is deterministic. In an embodiment, the base signal contains a complete cycle of phase. In an embodiment, a periodicity of the one or more symbol is a multiple of a periodicity of the base signal. In an embodiment, the signal of variable duration is configured by the first device to a second device, the configuration comprising one or more of information of the base signal, the phase of the signal of variable duration at each time instance relative to the starting and ending timing of a symbol, and the periodicity of the base signal. In an embodiment, the method includes transmitting, by the first device, one or more symbols with the starting timing and ending timing of each symbol in accordance with the starting timing and an ending timing of the one or more symbols of a first carrier in accordance with the reference timing. In an embodiment, the symbol is an orthogonal frequency division multiplexing (OFDM) symbol. In an embodiment, the signal of variable duration is a first signal of variable duration and the duration of the first signal of variable duration is different from the duration of a second signal of variable duration. In an embodiment, the signal of variable duration is determined according to at least one of a frequency grid, timing, sequence, cyclic shift, and carrier information about the transmission of the signal of variable duration. In an embodiment, the signal of variable duration is determined according to a number of configured antenna ports. In an embodiment, multiple antenna ports of the first device are multiplexed through orthogonal cyclic shifts. In an embodiment, multiple antenna ports of the first device are multiplexed through frequency division multiplexing (FDM). In an embodiment, determining the starting timing and the ending timing of one or more symbols of the first carrier in accordance with the reference timing includes determining the starting timing and the ending timing of each of the symbols of the first carrier in accordance with the reference timing. In an embodiment, the offset is zero. In an embodiment, the first device is an evolved NodeB (eNB).

In an embodiment, a method in a user equipment (UE) for receiving a signal of variable duration from a transmission point in a wireless network includes receiving a configuration of a signal of variable duration for a first carrier from the transmission point (TP), wherein the configuration signaling is received on a second carrier from the TP; receiving a signal to start monitoring the first carrier, wherein the signal is received on the second carrier from the TP; capturing at least a portion of the signal of variable duration in the first carrier from the TP; and determining timing information according to a partial signal of variable duration, the timing information comprising a starting timing and an ending timing of one or more symbols of the first carrier in accordance with a reference timing, wherein the starting timing of the captured portion of the signal of variable duration is offset from the starting timing of any of the one or more symbols. In an embodiment, the portion of a signal of variable duration captured comprises less than a portion of the signal of variable duration transmitted by the TP. In an embodiment, the signal of variable duration is a first signal of variable duration and the duration of the first signal of variable duration is different from the duration of a second signal of variable duration. In an embodiment, the duration of the signal of variable duration is not pre-determined. In an embodiment, the duration of the signal of variable duration is not configured in the configuration signaling. In an embodiment, the method also includes acquiring a starting timing and an ending timing of each symbol on the first carrier before reception of the at least a portion of the signal of variable duration. In an embodiment, the configuration of a signal of variable duration comprises a reference timing. In an embodiment, the reference timing is acquired by the UE via a timing synchronization of the UE to a second carrier signal of the TP. In an embodiment, the first carrier is a carrier that is not in a licensed band. In an embodiment, the second carrier is a carrier that is in a licensed band. In an embodiment, the first carrier comprises a plurality of symbols, wherein the a starting timing and an ending timing of each of the symbols on the first carrier are acquired by the UE according to one of a discovery signal (DS), a reference signal (RS), and a synchronization signal (PSS/SSS) on the first carrier of the TP. In an embodiment, the symbol comprises an orthogonal frequency division multiplexing (OFDM) symbol. In an embodiment, an ending timing of the signal of variable duration is aligned with an ending timing of a symbol of a first carrier signal. In an embodiment, the signal of variable duration is determined according to a starting timing and an ending timing of one or more symbols of the first carrier in accordance with a reference timing for transmission and reception, wherein each of the symbols has a fixed duration. In an embodiment, the reference timing is a timing of the second carrier of the TP. In an embodiment, the starting timing and the ending timing of each symbol on the first carrier of the TP are aligned with those on a second carrier of the TP. In an embodiment, the starting timing of the signal of variable duration on the first carrier is not signaled to a second device before the transmission of the signal of variable duration. In an embodiment, the signal of variable duration is a reference signal. In an embodiment, the signal of variable duration is determined according to a cyclic extension of a base signal, and a phase of the signal of variable duration at each time instance relative to the starting and ending timing of a symbol is deterministic. In an embodiment, the base signal contains a complete cycle of phase. In an embodiment, a periodicity of the one or more symbols is a multiple of a periodicity of the base signal. In an embodiment, the method includes receiving one or more symbols with the starting timing and the ending timing of each symbol in accordance with the reference timing. In an embodiment, the signal of variable duration comprises an orthogonal frequency division multiplex (OFDM) symbol. In an embodiment, the signal of variable duration is determined according to at least one of a frequency grid, timing, sequence, cyclic shift, and carrier information about the transmission of the signal of variable duration. In an embodiment, the signal of variable duration is determined according to a number of configured antenna ports of the TP.

In an embodiment, multiple antenna ports of the TP are multiplexed through one of orthogonal cyclic shifts and frequency division multiplexing (FDM).

In an embodiment, a network device for transmitting a signal to a wireless device, includes a processor and a non-transitory computer readable storage medium storing programming for execution by the processor, the programming including instructions to: determine a starting timing and an ending timing of one or more symbols of a first carrier in accordance with a reference timing for transmission and reception, wherein each of the symbols has a fixed duration; determine a signal of variable duration on the first carrier, wherein the starting timing of the signal of variable duration is offset from the starting timing of any of the one or more symbols of the first carrier in accordance with the reference timing; and transmit on the first carrier, the signal of variable duration, at the starting timing of the signal of variable duration. In an embodiment, the signal of variable duration is a first signal of variable duration and the duration of the first signal of variable duration is different from the duration of a second signal of variable duration. In an embodiment, the duration of the signal of variable duration is not pre-determined. In an embodiment, the signal of variable duration is determined according to at least one of a frequency grid, timing, sequence, cyclic shift, and carrier information about the transmission of the signal of variable duration. In an embodiment, the signal of variable duration is determined according to a number of configured antenna ports.

In an embodiment, a network device for obtaining a reference signal from a transmission point in a wireless network includes a processor and a non-transitory computer readable storage medium storing programming for execution by the processor, the programming including instructions to: receive a configuration of signal of variable duration for a first carrier from a transmission point (TP), wherein the configuration signaling is received on a second carrier from the TP; receive a signal to start monitoring the first carrier, wherein the signal is received on the second carrier from the TP; capture at least a portion of a signal of variable duration in the first carrier from the TP; and determine control information according to a partial signal of variable duration, timing information comprising a starting timing and an ending timing of one or more symbols of the first carrier in accordance with a reference timing, wherein the starting timing of the captured portion of the signal of variable duration is offset from the starting timing of any of the one or more symbols.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for wireless communications, comprising:
    determining, by a transmit point (TP), a starting timing and an ending timing of one or more symbols of a first carrier in accordance with a reference timing for transmission and reception, wherein each of the one or more symbols has a fixed duration;
    generating, by the TP, a signal of variable duration on the first carrier based on a cyclic extension of a base signal, wherein a starting timing of the signal of variable duration is offset from the starting timing of any of the one or more symbols of the first carrier in accordance with the reference timing; and transmitting, by the TP to a user equipment (UE) on the first carrier, the signal of variable duration, at the starting timing of the signal of variable duration.

2. The method of claim 1, wherein the reference timing is a second timing of a second carrier of the first device TP.

3. The method of claim 1, wherein an ending timing of the signal of variable duration is aligned with the ending timing of one of the one or more symbols of the first carrier.

4. The method of claim 1, wherein the starting timing of the signal of variable duration is determined in accordance with one of a completion of a clear channel assessment (CCA) procedure on the first carrier, an availability of data or control information, or an indication of a network controlling device.

5. The method of claim 1, wherein the starting timing and the ending timing of each symbol on the first carrier are acquired by the UE before the transmission of the signal of variable duration.

6. The method of claim 5, wherein the reference timing is acquired by the UE via a timing synchronization of the UE to a second carrier of the TP.

7. The method of claim 6, wherein the first carrier is a carrier not in a licensed band and/or the second carrier is a carrier in a licensed band.

8. The method of claim 5, wherein the starting timing and the ending timing of each symbol on the first carrier in accordance with the reference timing of the TP are acquired by the UE based on one of a discovery signal (DS), a reference signal (RS), or a synchronization signal (PSS/SSS) on the first carrier of the first device TP.

9. The method of claim 5, wherein the starting timing and the ending timing of each symbol on the first carrier of the TP are aligned with those on a second carrier of the TP.

10. The method of claim 5, wherein the transmission of the signal of variable duration on the first carrier is not signaled to the UE before the transmission of the signal of variable duration.

11. The method of claim 5, wherein the starting timing of the signal of variable duration on the first carrier is not signaled to the UE before the transmission of the signal of variable duration.

12. The method of claim 5, wherein the TP transmits on a second carrier to the UE a signal to start monitoring the first carrier before the transmission of the signal of variable duration.

13. The method of claim 1, wherein a phase of the signal of variable duration at each time instance relative to the starting and the ending timing of a symbol is deterministic, wherein the base signal contains a complete cycle of phase, and wherein a periodicity of the one or more symbols is a multiple of a periodicity of the base signal.

14. The method of claim 13, wherein the signal of variable duration is configured by the TP to the UE, the configuration comprising one or more of information of the base signal, the phase of the signal of variable duration at each time instance relative to the starting timing and the ending timing of a symbol, or the periodicity of the base signal.

15. The method of claim 1, further comprising, transmitting, by the TP, one or more symbols with the starting timing and the ending timing of each symbol in accordance with the starting timing and the ending timing of the one or more symbols of a first carrier in accordance with the reference timing.

16. The method of claim 1, wherein the signal of variable duration is determined according to at least one of a frequency grid, timing, sequence, cyclic shift, carrier information about the transmission of the signal of variable duration, or a number of configured antenna ports.

17. The method of claim 1, wherein multiple antenna ports of the TP are multiplexed through one of orthogonal cyclic shifts and frequency division multiplexing (FDM).

18. The method of claim 1, wherein determining the starting timing and the ending timing of one or more symbols of the first carrier in accordance with the reference timing comprises determining the starting timing and the ending timing of each of the symbols of the first carrier in accordance with the reference timing.

19. The method of claim 1, wherein the offset is zero.

20. The method of claim 1, further comprising:
performing sensing on the first carrier by the TP to determining that the first carrier is idle; and
wherein generating the signal of variable duration is performed in response to determining that the first carrier is idle.

21. A method in a user equipment (UE) for receiving a signal of variable duration from a transmission point (TP) in a wireless network, comprising:
receiving, by the UE on a second carrier, a configuration signaling for a signal of variable duration for a first carrier from the TP;
receiving a signal to start monitoring the first carrier, wherein the signal to start monitoring the first carrier is received on the second carrier by the UE from the TP;
capturing a portion of the signal of variable duration in the first carrier by the UE from the TP;
determining, by the UE, timing information according to the portion of the signal of variable duration, the timing information comprising a starting timing and an ending timing of one or more symbols of the first carrier in accordance with a reference timing, wherein a starting timing of the portion of the signal of variable duration is offset from the starting timing of any of the one or more symbols; and
receiving one or more symbols with the starting timing of the one or more symbols and the ending timing of the one or more symbols in accordance with the reference timing.

22. The method of claim 21, wherein the portion of the signal of variable duration captured comprises less than a portion of the signal of variable duration transmitted by the TP.

23. The method of claim 21, further comprising acquiring a starting timing and an ending timing of each symbol on the first carrier before reception of the portion of the signal of variable duration.

24. The method of claim 21, wherein the reference timing is acquired by the UE via a timing synchronization of the UE to a second carrier signal of the TP.

25. The method of claim 21, wherein an ending timing of the signal of variable duration is aligned with an ending timing of a symbol of a first carrier signal.

26. The method of claim 21, wherein the reference timing is a timing of the second carrier of the TP.

27. The method of claim 21, wherein the starting timing and the ending timing of each symbol on the first carrier of the TP are aligned with those on a second carrier of the TP.

28. A network device for transmitting a signal to a wireless device, comprising:
a processor; and
a non-transitory computer readable storage medium storing programming for execution by the processor, the programming including instructions to:

determine a starting timing and an ending timing of one or more symbols of a first carrier in accordance with a reference timing for transmission and reception, wherein each of the symbols has a fixed duration;

determine a signal of variable duration on the first carrier, wherein a starting timing of the signal of variable duration is offset from the starting timing of any of the one or more symbols of the first carrier in accordance with the reference timing; and transmit on the first carrier, the signal of variable duration, at the starting timing of the signal of variable duration.

29. The network device of claim 28, wherein the signal of variable duration is determined according to at least one of a frequency grid, timing, sequence, cyclic shift, carrier information about the transmission of the signal of variable duration, or a number of configured antenna ports.

30. A network device for obtaining a reference signal from a transmission point in a wireless network, comprising:

a processor; and a non-transitory computer readable storage medium storing programming for execution by the processor, the programming including instructions to:

receive, on a second carrier from a transmission point (TP), a configuration signaling of signal of variable duration for a first carrier from the TP;

receive a signal to start monitoring the first carrier, wherein the signal to start monitoring the first carrier is received on the second carrier from the TP;

capture a portion of a signal of variable duration in the first carrier from the TP; and determine control information according to the portion of the signal of variable duration, timing information comprising a starting timing and an ending timing of one or more symbols of the first carrier in accordance with a reference timing, wherein a starting timing of the portion of the signal of variable duration is offset from the starting timing of any of the one or more symbols.

* * * * *

UNITED STATES PATENT AND TRADEMARK OFFICE
CERTIFICATE OF CORRECTION

PATENT NO. : 10,003,986 B2
APPLICATION NO. : 14/863382
DATED : June 19, 2018
INVENTOR(S) : Jialing Liu Page 1 of 1

It is certified that error appears in the above-identified patent and that said Letters Patent is hereby corrected as shown below:

In the Claims

Column 35, Line 7, Claim 2, delete "first device".

Column 35, Line 32, Claim 8, delete "first device".

Signed and Sealed this
Fourth Day of September, 2018

Andrei Iancu
*Director of the United States Patent and Trademark Office*